(12) United States Patent
Kono et al.

(10) Patent No.: US 10,651,651 B2
(45) Date of Patent: May 12, 2020

(54) DEVICE WITH BUILT-IN ACTIVE FILTER

(71) Applicant: DAIKIN INDUSTRIES, LTD., Osaka-shi, Osaka (JP)

(72) Inventors: Masaki Kono, Osaka (JP); Reiji Kawashima, Osaka (JP); Takayuki Fujita, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/342,020

(22) PCT Filed: Dec. 8, 2017

(86) PCT No.: PCT/JP2017/044217
§ 371 (c)(1),
(2) Date: Apr. 15, 2019

(87) PCT Pub. No.: WO2018/105737
PCT Pub. Date: Jun. 14, 2018

(65) Prior Publication Data
US 2019/0252881 A1   Aug. 15, 2019

(30) Foreign Application Priority Data
Dec. 9, 2016   (JP) .............................. 2016-239707

(51) Int. Cl.
*H02J 3/00* (2006.01)
*H02J 3/01* (2006.01)
*H02M 1/12* (2006.01)
*H02M 7/12* (2006.01)
*H02M 7/493* (2007.01)
*H02M 7/48* (2007.01)

(52) U.S. Cl.
CPC ................. *H02J 3/01* (2013.01); *H02M 1/12* (2013.01); *H02M 7/12* (2013.01); *H02M 7/48* (2013.01); *H02M 7/493* (2013.01); *Y02P 80/10* (2015.11); *Y02P 80/11* (2015.11)

(58) Field of Classification Search
CPC .. H02J 3/01; H02M 7/12; H02M 1/12; H02M 7/493; H02M 7/48
See application file for complete search history.

(56) References Cited

U.S. PATENT DOCUMENTS

2002/0031000 A1 * 3/2002 Sakai .................... H02J 1/10
363/65

FOREIGN PATENT DOCUMENTS

| EP | 2 998 414 A1 | 2/2016 |
| EP | 2 999 104 A1 | 3/2016 |

(Continued)

OTHER PUBLICATIONS

International Search Report (PCT/ISA/210) issued in PCT/JP2017/044217, dated Jan. 16, 2018.
(Continued)

*Primary Examiner* — Adolf D Berhane
*Assistant Examiner* — Afework S Demisse
(74) *Attorney, Agent, or Firm* — Birch, Stewart, Kolasch & Birch, LLP

(57) ABSTRACT

In a device with a built-in active filter, the device incorporating an active filter therein and being connected to an AC power source, the active filter operates based on a value detected by a load information detection unit detecting load information on an AC power source outside the device with a built-in active filter.

8 Claims, 15 Drawing Sheets

(56) References Cited

FOREIGN PATENT DOCUMENTS

| JP | 3-239194 A | 10/1991 |
| JP | 7-170647 A | 7/1995 |
| JP | 2012-50177 A | 3/2012 |
| JP | 2016-116330 A | 6/2016 |

OTHER PUBLICATIONS

A Nonymous, DANFOSS: "Operating Instructions VLT Automation Drive FC 302 Low Harmonic Drive 132-630 kW", Apr. 30, 2015, pp. 1-120, XP0055678282, Retrieved from the Internet: URL:http://files.danfoss.com/download/Drives/MG37A302.pdf (retrieved on Mar. 20, 2020).

Extended European Search Report dated Apr. 3. 2020 in corresponding European Application No. 17878432.8.

* cited by examiner

DEVICE WITH BUILT-IN ACTIVE FILTER

TECHNICAL FIELD

The present invention relates to a device with a built-in active filter.

BACKGROUND ART

In an air conditioner or any other apparatuses, an active filter may be provided in order to prevent a harmonic current from flowing out into a power system (e.g., a power system including a commercial power source) (see, for example, Patent Document 1).

CITATION LIST

Patent Document

[Patent Document 1] Japanese Unexamined Patent Publication No. 2016-116330

SUMMARY OF THE INVENTION

Technical Problem

However, a load device other than the air conditioner (e.g., a device including an inverter circuit, such as an elevator) is sometimes connected to the power system to which an air conditioner is connected. Such a load device other than the air conditioner may become a source of a harmonic current. In this case, it is not sufficient to take measures against the harmonic current of the air conditioner alone, and the harmonic current of the other devices need to be considered. In addition, correction of a power factor of a fundamental wave is required from the viewpoint of reduction in facility capacity, and energy saving.

The present invention is directed to a device with a built-in active filter incorporating an active filter therein, and intends to allow the active filter to act also on other load devices different from the device with a built-in active filter.

Solution to the Problem

In order to solve the above problem, a first aspect of the present invention is directed to a device with a built-in active filter, the device including an active filter (4) and being connected to an AC power source (3), wherein the active filter (4) is configured to operate based on a value detected by a load information detection unit (5) detecting load information on the AC power source (3) outside the device with a built-in active filter.

In this configuration, the active filter (4) functions based on the load information on the AC power source (3) in the power system outside the device with a built-in active filter.

A second aspect is an embodiment of the first aspect. In the second aspect, based on the detected value, the active filter (4) may output a current for at least one of reduction of a harmonic current in the AC power source (3) or correction of a power factor of fundamental wave in the AC power source (3).

This configuration allows the active filter (4) to at least reduce the harmonic current or correct the power factor of fundamental wave.

A third aspect is an embodiment of the first aspect. In the third aspect, the operation of the active filter (4) may be controlled by a controller (43) included in the device with a built-in active filter, and the controller (43) may obtain a degree of the current (Ic) output by the active filter (4), using a current value (iq2*) corresponding to a reactive current in another load device (20) connected to the AC power source (3) and a current value (ir1, it1) of a current flowing from the AC power source (3) to the active filter (4).

In this configuration, the power factor is corrected based on the reactive current in the other load device (20). Therefore, in the case where another load is connected to the power system together with the air conditioner, the configuration can correct the power factor without increasing the capacity of the active filter.

A fourth aspect is an embodiment of the third aspect. In the fourth aspect, the active filter (4) may use only a fundamental wave component of the reactive current as the current value (iq2*) corresponding to the reactive current.

This configuration is suitable for correcting the power factor in the case where the harmonic current output from the other load device (20) is small or the other load device (20) does not output the harmonic current.

A fifth aspect is an embodiment of the first aspect. In the fifth aspect, a phase modification unit (200) may be connected to the AC power source (3) in parallel with the device with a build-in active filter to control a reactive power of the AC power source (3), and based at least on one of the reactive power of or a power source power factor of the AC power source (3), the active filter (4) operates to correct a leading power factor caused by the control of the reactive power by the phase modification unit (200).

In this configuration, when the active filter (4) operates, the actual power source power factor becomes a lagging power factor in relation to a target power factor, in contrast to the phase modification unit (200). Thus, in this case, the actual power source power factor to be a leading power factor in relation to the target power factor because of the control of the reactive power by the phase modification unit (200) is corrected through the control of the operation of the active filter (4). As a result, a phenomenon in which the actual power source power factor becomes a leading power factor due to the phase modification unit (200) can be easily corrected, thereby achieving appropriate compensation of the actual power source power factor and correction of the power factor of fundamental wave. Accordingly, such features make it possible to reduce the possibility of the occurrence of failures such as an increase in power loss of the power system of the AC power source (3) and an unnecessary increase in the voltage of the system.

A sixth aspect is an embodiment of the first aspect. In the sixth aspect, a magnitude of the current output from the active filter (4) may be calculated, using: a current value (iq) corresponding to a reactive current of a phase modification unit (200) and a load device (10) other than the device with a built-in active filter: and a current value (ir1, it1) of a current flowing from the connected to the AC power source (3) to the load device (10).

In this configuration, the reactive current of the load device other than the device with a built-in active filter and of the phase modifier is determined and the current (Ic) is supplied to compensate the determined reactive current.

A seventh aspect is an embodiment of any one of the first to sixth aspects. In the seventh aspect, the load information detection unit (5) may be configured to detect a current value (Irs, Its), and to transmit the detected current value (Irs, Its) in a wireless manner.

This configuration makes is possible to omit wiring by adopting the wireless transmission.

An eighth aspect is an embodiment of any one of the first to seventh aspects. In the eighth aspect, the load information detection unit (5) may operate with no power source.

This configuration makes it possible to omit wiring, using no power source.

A ninth aspect is an embodiment of any one of the first to eighth aspects. In the ninth aspect, the load information detection unit (5) may be provided with current detectors (4a, 4b, 4c) for detecting current values (Irs, Iss, Its), each of the current detectors corresponding to one of phases (R, S, T) of the AC power source (3).

This configuration makes it possible to detect the current value with reliability even if the load device (1, 2) is a device which operates in single-phase alternating current.

Advantages of the Invention

According to the first aspect of the present invention, in the device with a built-in active filter incorporating an active filter therein, an active filter can act also on another load device, which is different from the device with a built-in active filter, connected to the AC power source.

According to the second aspect, in the power system to which a plurality of load devices are connected, at least the harmonic current can be reduced or the power factor of fundamental wave can be corrected.

According to the third aspect, the power factor can be corrected without increasing the size of the active filter.

According to the fourth aspect of the present invention, it is possible to generate a compensation current which is suitable for the case where no countermeasure for the harmonic current is required in a load connected to the power system together with the device with a built-in active filter.

According to the fifth aspect, a phenomenon in which the actual power factor becomes a leading power factor due to the phase modifier is easily improved, which can achieve appropriate compensation of the actual power factor and correction in the power factor of fundamental wave. Hence, it is possible to reduce the possibility of the occurrence of a failure such as the increase in power loss of the power system of the AC power source and the unnecessary increase in the voltage of the system.

According to the sixth aspect, it is possible to correct the power factor in a building or any other facility having a phase modifier.

According to the seventh and eighth aspects, installation of the device is facilitated.

According to the ninth aspect, even if the load device operates on a single-phase alternating current, it is possible to reliably obtain the above-described effect.

DESCRIPTION OF EMBODIMENTS

Embodiments of the present invention will be described in detail below with reference to the drawings. The embodiments described below are merely exemplary ones in nature, and are not intended to limit the scope, applications, or use of the invention.

First Embodiment

Figure 1:
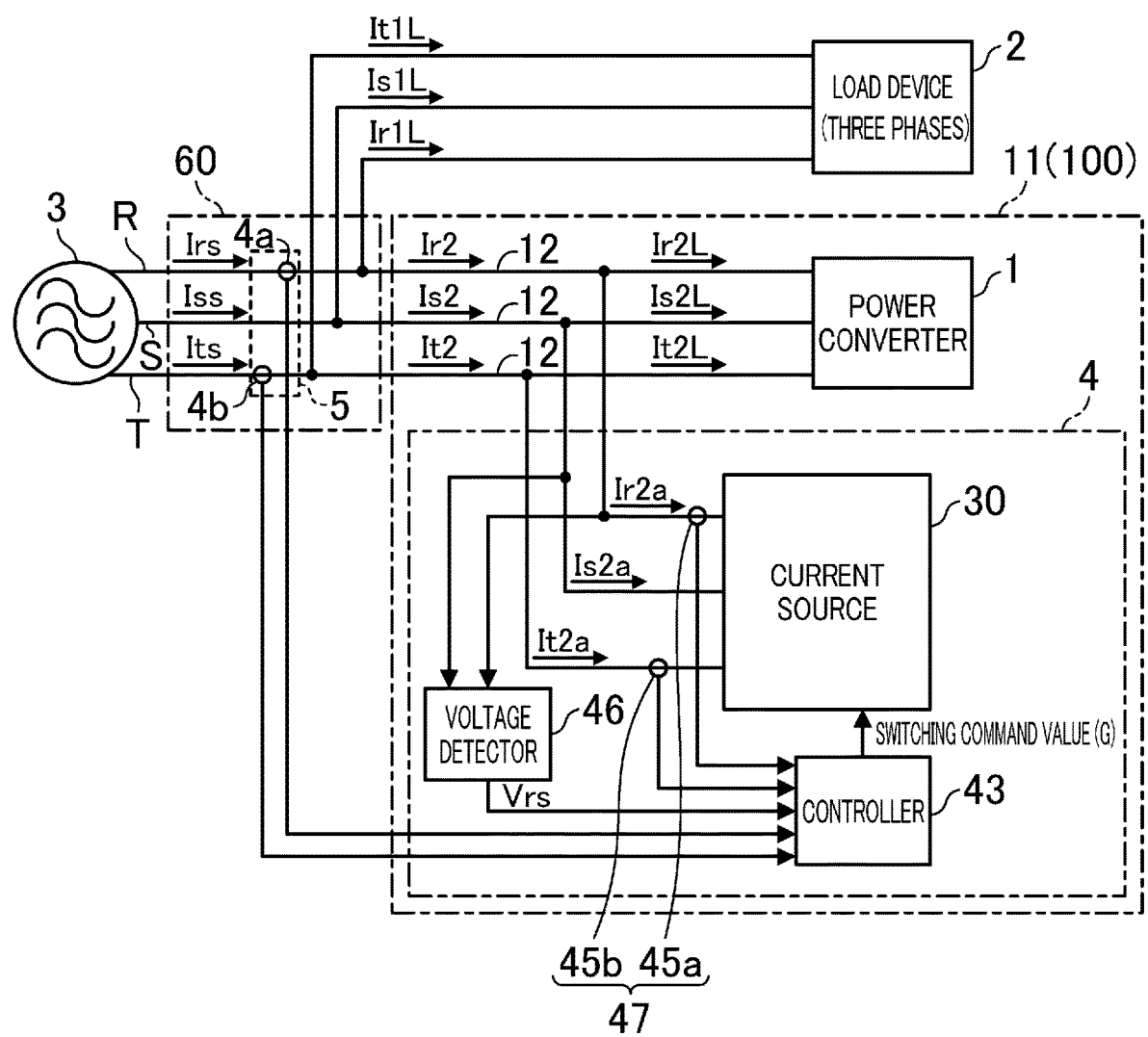
FIG. 1 is a block diagram illustrating an air conditioning system according to a first embodiment.

FIG. 1 is a block diagram illustrating an air conditioning system (100) according to a first embodiment of the present invention. In this example, the air-conditioning system (100) includes an air conditioner (11) and an active filter (4). The air conditioning system (100) is installed in a condominium, a factory, a building, or a house (will be hereinafter simply referred to as a building or any other facility), and conditioning (cooling and heating) air in a room by the air conditioner (11).

A building or any other facility in which the air conditioner (11) is installed is supplied with electric power from a power system including an AC power source (3). In this example, the AC power source (3) is a three-phase AC power source (e.g., a three-phase commercial power source), and divides power and supplies the divided power to a plurality of load devices (to be described later). The building or any other facility is provided with a distribution board (60) which is connected to the AC power source (3) and receives AC power from the AC power source (3). The distribution board (60) includes a plurality of breakers through which the AC power from the AC power source (3) is divided into the plurality of devices. In this example, the air conditioner (11) is connected to one of the breakers. The air conditioner (11) is driven by the AC power supplied via the distribution board (60). In other words, the air conditioning system (100) is an example of a device which incorporates the active filter (4) (will be hereinafter referred to as a "device with a built-in active filter") and which is connected to the AC power source (3). Note that the device with a built-in active filter may be a device provided for a building, such as an elevator, a fan, a pump, an escalator, or a lighting powered by a three-phase power source.

In addition to the air conditioner (11), a load device (2) is also connected to the distribution board (60). In this example, the load device (2) is a device including a circuit that can be a source of a harmonic current, such as an inverter circuit. Such a device will be referred to as a "harmonics generating load device." Examples of the load device (2) include a device provided for a building, such as an elevator, a fan, a pump, an escalator, or a lighting driven by a three-phase power source, and other air conditioners than the air conditioner (11), which take no measures against the harmonic current, e.g., an active filter.

<Air Conditioner (11)>

The air conditioner (11) includes a refrigerant circuit (not shown) with a compressor, and a power converter (1), and incorporates the active filter (4) therein. The power converter (1) is a load device connected to the AC power source (3), and is an example of the harmonics generating load device. The power converter (1) is connected to the AC power source (3) via the distribution board (60). The power converter (1) includes a converter circuit and an inverter circuit (neither of which is shown). The AC power supplied to the power converter (1) is converted by the power converter (1) into AC power having a desired frequency and a desired voltage, and is supplied to a compressor (more specifically, an electric motor included in the compressor). As a result, the compressor operates, and the refrigerant circuit functions, so that the air in the room is conditioned.

When the power converter (1) and the electric motor of the compressor in the air conditioner (11) operate, a harmonic current may be generated. The harmonic current may possibly flows to the AC power source (3) via a current path through which power is supplied from the distribution board (60) to the air conditioner (11). Since the level of outflow of such harmonic current to the side of the AC power source (3) is generally restricted, the air conditioning system (100) causes the active filter (4) to reduce the outflow of the harmonic current. In addition, correction is required for the power factor of fundamental wave at a distributing end and a receiving end from the viewpoint of reduction in facility capacity, and energy saving. The active filter (4) of this embodiment also has the function of improving the power factor of fundamental wave. The configuration of the active filter (4) will be described below.

<Active Filter (4)>

The active filter (4) is incorporated in the air conditioner (11), and has the function of canceling the harmonic current flowing from the harmonics generating load device. Specifically, the active filter (4) allows a current (compensation current) to flow such that a current flowing through a current path (hereinafter referred to as a "power receiving path") connecting the AC power source (3) and the distribution board (60) is brought close to a sinusoidal current. More specifically, the active filter (4) detects a harmonic current in the power receiving path, generates a compensation current in antiphase with the detected harmonic current, and supplies the compensation current to the power receiving path of the air conditioner (11) (the power receiving path (12) of FIG. 1).

The harmonic current generated in the air conditioner (11) is assumed to increase to the maximum level when the load of the air conditioner (11) is maximized (e.g., at the maximum outlet power during cooling). Therefore, the capacity of the active filter (4) (the magnitude of power that can be generated by the active filter) is set based on the harmonic current at the maximum load of the air conditioner (11). In general, the air conditioner (11) is often used under an intermediate load, rather than the maximum load. If the active filter (4) whose capacity is set in this way is used only as a countermeasure against the harmonic current of the air conditioner (11), the capacity would be redundant for a quite long time during the operation.

The active filter (4) also has the function of correcting the power factor of fundamental wave. In this example, the active filter (4) is configured to feed a compensation current that also compensates a reactive component of the fundamental wave in order to correct the power factor of fundamental wave. To implement these functions of the active filter (4), the active filter (4) of this embodiment includes, as shown in FIG. 1, a current source (30), a controller (43), a voltage detector (46), a first current detection unit (5), and a second current detection unit (47).

—Voltage Detector and Current Detection Units—

The voltage detector (46) is a sensor that detects the voltage (Vrs) of the AC power source (3).

The second current detection unit (47) detects a current value (will be hereinafter referred to as a "current value (Ir2a, It2a)") input to the active filter (4). In this example, the second current detection unit (47) includes a current detector (45a) and a current detector (45b). The current detector (45a) detects a current value with an R phase (Ir2a) to be input to the active filter (4) from the AC power source (3). The current detector (45b) detects a current value with a T phase (It2a) to be input to the active filter (4) from the AC power source (3). The values detected by the current detectors (45a, 45b) are transmitted to the controller (43), in particular, a second current calculation unit (434) which will be described in detail later.

The configuration of the current detectors (45a, 45b) is not limited, but for example, a current transformer may be adopted. Each current detector (45a. 45b) may be configured to transmit the detected value to the controller (43) in a wired or wireless manner. FIG. 1 shows the current detectors (45a, 45b) of the second current detection unit (47) only for two phases. However, three current detectors may be provided for the second current detection unit (47) so that a current for three phases may be detected.

The first current detection unit (5) is an example of a load information detection unit, and detects a current value of a power receiving path (12) of the air conditioner (11). Specifically, the first current detection unit (5) detects a current value of the AC power source (3) before the current from the AC power source (3) is divided for the load devices (harmonics generating load devices). In this example, the first current detection unit (5) includes a current detector (4a) and a current detector (4b). The current detectors (4a, 4b) detect a current, of the AC power source (3), before input to the distribution board (60). More specifically, the current detector (4a) detects a current value with an R phase (Irs) of the AC power source (3). The current detector (4b) detects a current value with a T phase (Its) of the AC power source (3). The values detected by the current detectors (4a, 4b) are transmitted to the controller (43), in particular, a first current calculation unit (435) which will be described in detail later.

The configuration of the current detectors (4a. 4b) is not limited, but, for example, a current transformer may be adopted. Each current detector (4a, 4b) may be configured to transmit the detected value to the controller (43) in a wired or wireless manner.

The first current detection unit (5) may be arranged inside or outside the distribution board (60). In this embodiment, the current detectors (4a. 4b) are arranged inside the distribution board (60). When arranged inside the distribution board (60), the current detectors (4a. 4b) are protected from rain and wind, which advantageously improves the reliability and life of the current detectors (4a. 4b). The values detected by the current detectors (4a, 4b) are wirelessly transmitted to the controller (43). The distribution board (60) and the air conditioner (11) may be at a distance of 20 to 30 meters. Thus, much time and labor are required to connect the current detectors (4a, 4b) inside the distribution board (60) to the air conditioner (11) via wires. In this embodiment, the values detected by the current detectors (4a, 4b) are wirelessly transmitted to the controller (43). This can save the work for wire connection.

A phenomenon in which the current flowing through the current detectors (4a, 4b) changes a magnetic flux passing through the current detector (4a, 4b) with time is called electromagnetic induction. An induced electromotive force, which is an electromotive force generated through the electromagnetic induction may be used as a power source (e.g., a power source for communications) for driving the first current detection unit (5). In this manner, the first current detection unit (5) can be operated with no power source (i.e., operated without an external power source to be connected out of the first current detection unit (5)). The first current detection unit (5) configured to be operable with no power source advantageously saves time and labor.

—Current Source (30)—

The current source (30) generates a current for reducing the harmonic current and correcting the power factor of fundamental wave. An output terminal of the current source (30) is connected to the power receiving path (12) of the power converter (1) to output a generated compensation current to the power receiving path (12). The current source (30) of this embodiment includes a so-called inverter circuit. The current source (30) receives a switching command value (G), which will be described later, from the controller (43). The current source (30) performs switching in accordance with the switching command value (G) to generate the compensation current.

—Controller (43)—

Figure 2:
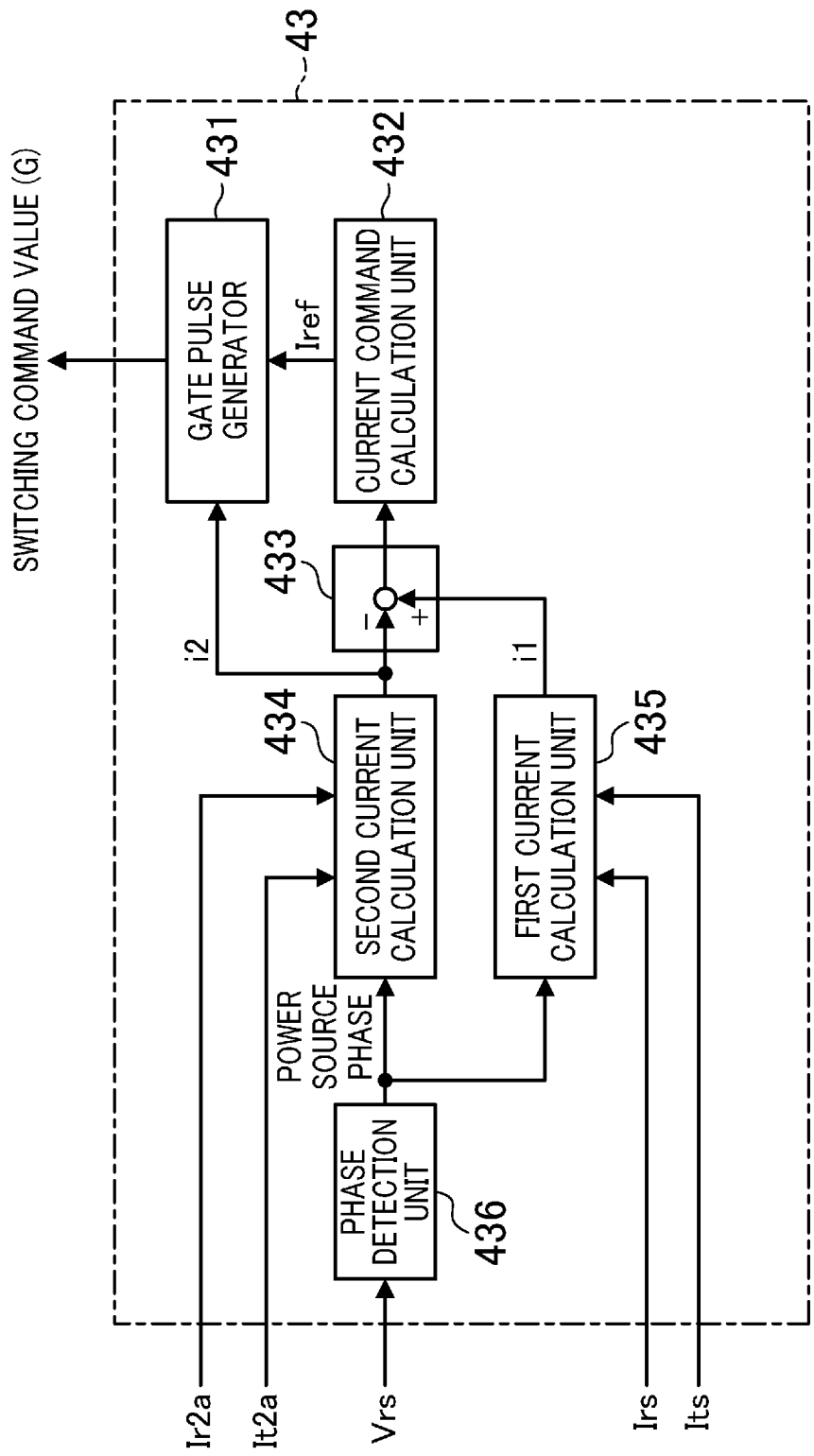
FIG. 2 is a block diagram illustrating an example of a controller according to the first embodiment.

FIG. 2 is a block diagram illustrating an example of the controller (43) according to the first embodiment. The controller (43) controls an output current of the current source (30). In this example, the controller (43) includes a gate pulse generator (431), a current command calculation unit (432), a load current calculation unit (433), a second current calculation unit (434), a first current calculation unit (435), and a phase detection unit (436). The controller (43) may include, for example, a microcomputer and a memory device storing a program for operating the microcomputer.

The phase detection unit (436) receives a voltage (Vrs) detected by the voltage detector (46), detects the phase of a power source voltage at the power receiving path (12), and transmits the detected phase to the first and second current calculation units (435) and (434).

Based on the phase detected by the phase detector (436) and the current values (Irs, Its) detected by the current detectors (4a, 4b), the first current calculation unit (435) calculates a current (will be referred to as a "first current value (i1)") required to compensate (reduce) the harmonic current and compensate the reactive component of the fundamental wave (correct the power factor of fundamental wave), and outputs the first current value (i1) to the load current calculation unit (433). Specifically, the first current calculation unit (435) extracts a harmonic current component and a reactive component of the fundamental wave from the values (Irs, Its) detected by the current detectors (4a. 4b), and outputs the extracted components as the first current value (i1).

Further, based on the phase detected by the phase detector (436) and the current values (Ir2a, It2a) detected by the current detectors (45a, 45b), the second current calculation unit (434) calculates a current (will be referred to as a "second current value (i2)") flowing into the active filter (4) performing both the compensation (reduction) of the harmonic current at present and the compensation of the reactive component of the fundamental wave (correction of the power factor of fundamental wave). The second current calculation unit (434) then outputs the second current value (i2) to the load current calculation unit (433). Specifically, the second current calculation unit (434) extracts a harmonic current component and a reactive component of the fundamental wave from the values (Ir2a, It2a) detected by the current detectors (45a, 45b), and outputs them as the second current value (i2).

The load current calculation unit (433) calculates currents flowing through the load device (2) (three-phase harmonics generating load device) and the power converter (1) (harmonics generating load device). Among the current values of different phases (Ir1L, Is1L, It1L) input to the load device (2), which is an example of the three-phase harmonics generating load device, the current values of different phases (Ir2, Is2, It2) input to the air conditioner (11), the current values of different phases (Ir2L, Is2L, It2L) input to the power converter (1), i.e., the harmonics generating load device, and the current values of different phases (Ir2a, Is2a, It2a) input to the active filter (4), the following relational expressions hold.

$R$ phase: $Irs=Ir1L+Ir2=Ir1L+Ir2L+Ir2a$ $S$ phase: $Iss=Is1L+Is2=Is1L+Is2L+Is2a$ $T$ phase: $Its=It1L+It2=It1L+It2L+It2a$ (1)

As can be seen from the relational expressions, the following expressions are obtained through subtraction of the current values of different phases (Ir2a, Is2a, It2a) input to the active filter (4) from the current values of different phases (Irs, Iss, Its) flowing through the AC power source (3).

$R$ phase: $Irs-Ir2a=Ir1L+Ir2-Ir2a=Ir1L+Ir2L+Ir2a-Ir2a$ $S$ phase: $Iss-Is2a=Is1L+Is2-Is2a=Is1L+Is2L+Is2a-Is2a$ $T$ phase: $Its-It2a=It1L+It2-It2a=It1L+It2L+It2a-It2a$ (2)

The expression (2) can be simplified as described below.

$Irs-Ir2a=Ir1L+Ir2L$ $Iss-Is2a=Is1L+Is2L$ $Its-It2a=It1L+It2L$ (3)

As can be seen from the expression (3), subtracting the current values of different phases (Ir2a, Is2a, It2a) input to the active filter (4) from the current values of different phases (Irs, Iss, Its) flowing through the AC power source (3) makes it possible to obtain a current flowing through the load device (2) (three-phase harmonics generating load device) and the power converter (1) (harmonics generating load device). Based on the above-described relationship, this embodiment achieves the reduction in the power factor of fundamental wave and harmonic wave generated in the load device (2) and the power converter (1), the correction of the power factor of fundamental wave at a distributing end and a receiving end near the AC power source (3), and the reduction in the harmonic current. Specifically, in this embodiment, the load current calculation unit (433) calculates the current flowing through the load device (2) and the power converter (1) and outputs the calculated current to the current command calculation unit (432). More specifically, the load current calculation unit (433) calculates the first current value (i1)—the second current value (i2), and outputs the calculated value to the current command calculation unit (432).

The current command calculation unit (432) calculates a current value in antiphase with the current calculated by the load current calculation unit (433), and outputs the calculated value as a current command value (Iref) to the gate pulse generator (431). The gate pulse generator (431) generates the switching command value (G) to instruct the switching of the inverter circuit serving as the current source (30). Specifically, the gate pulse generator (431) performs feedback control of repeating the generation of the switching command value (G) based on a deviation between the output current value of the current source (30) and the current command value (Iref). As a result, the current source (30) supplies the power receiving path (12) with the current (compensation current) corresponding to the current command value (Iref). More specifically, the gate pulse generator (431) outputs the switching command value (G) to the current source (30) so that the second current value (i2) obtained by the second current calculation unit (434) coincides with the current command value (Iref). As a result, the harmonic component contained in the current flowing through the load device (2) and the power converter (1) is canceled by the current output from the active filter (4). The current flowing from the AC power source (3) becomes a sinusoidal wave from which the harmonic current is removed, thereby correcting the power factor.

<Operation of Active Filter (4)>

The active filter (4) is incorporated in the air conditioning system (100). Thus, when the air conditioning system (100) is supplied with power, the active filter (3) is also operable.

When the current command calculation unit (432) generates the current command value (Iref), the gate pulse generator (431) generates the switching command value (G), and the current source (30) outputs to the power receiving path (12) the compensation current corresponding to the current command value (Iref). In this embodiment, the harmonic current generated not only by the air conditioner (11), but also by another load device (2), can be reduced, and the power factor of fundamental wave can be corrected.

Advantages of Embodiment

As can be seen, according to this embodiment, the harmonic current can be reduced in the power system connected to a plurality of load devices (in this case, the power converter (1) and the load device (2)). Moreover, in this embodiment, the power factor of fundamental wave can also be corrected.

Second Embodiment

Figure 3:
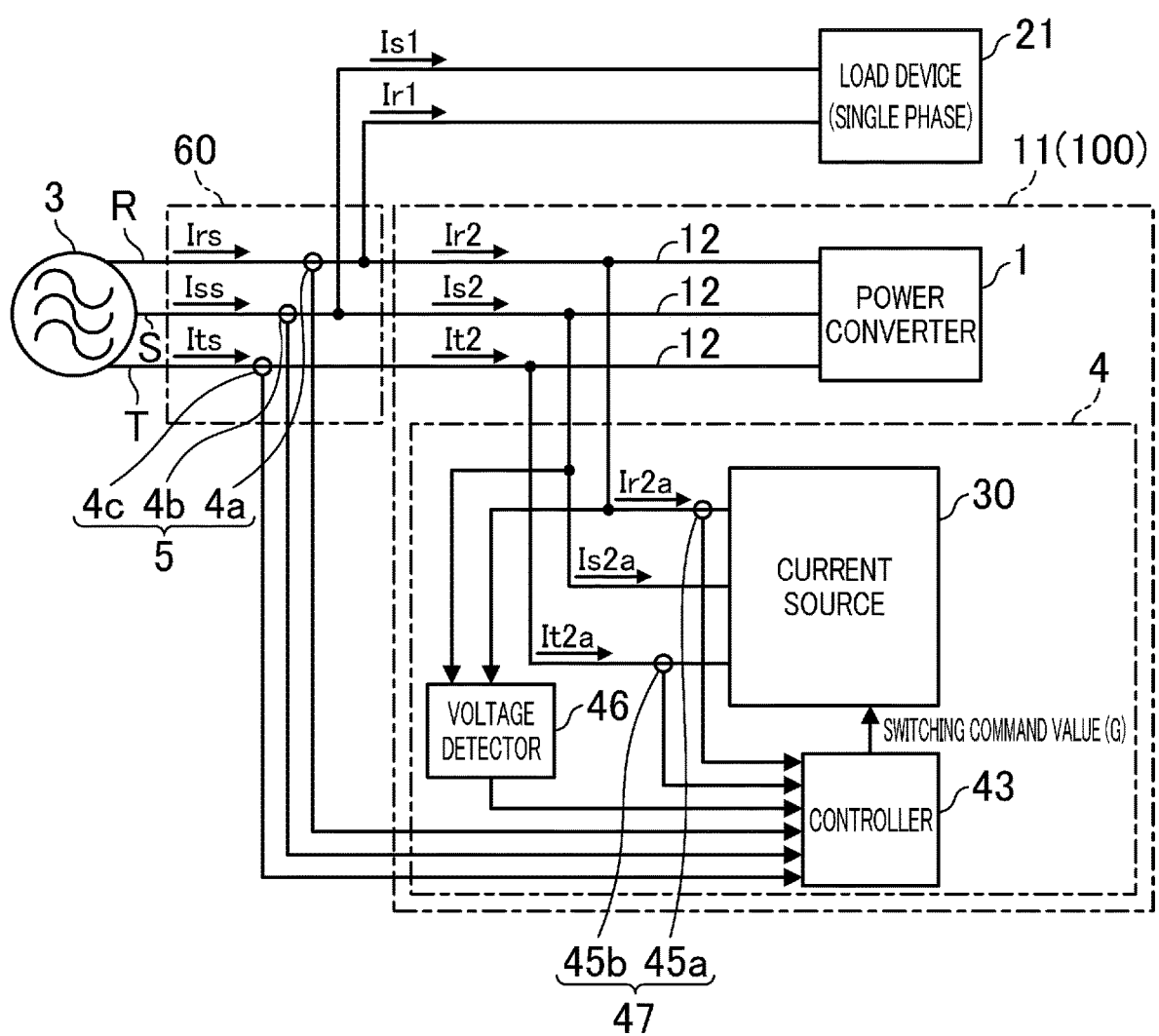
FIG. 3 is a block diagram illustrating an air conditioning system according to a second embodiment.

FIG. 3 is a block diagram illustrating an air conditioning system (100) according to a second embodiment of the present invention. The second embodiment is different from the first embodiment in that the other load device (21), which is the harmonics generating load device, is driven on a single phase voltage. The other load device (21) includes lighting appliances such as an LED, and a single phase fan or pump, for example. In this embodiment, on the assumption that the connection phase of the other load device (21), i.e., a device driven by a single phase voltage, is unknown, the first current detection unit (5) is provided with three current detectors (4a, 4b, 4c) to detect the current values of different phases (R, S, T) of the AC power source (3), i.e., the current values of all three phases. That is, in this configuration, the current value can be detected with reliability even if the load device (21) is driven on a single phase alternating voltage.

As can be seen, this embodiment can reduce the harmonic current when the other load device (21) as well as the air conditioner (11) is connected. Moreover, in this embodiment, the power factor of fundamental wave can also be improved.

If the phase of the AC power source (3) connected to the single phase load device (21) is known in advance, the first current detection unit (5) may be configured such that the current detectors (4a, 4b) are respectively provided only for the two phases connected to the load device (21).

Third Embodiment

Figure 4:
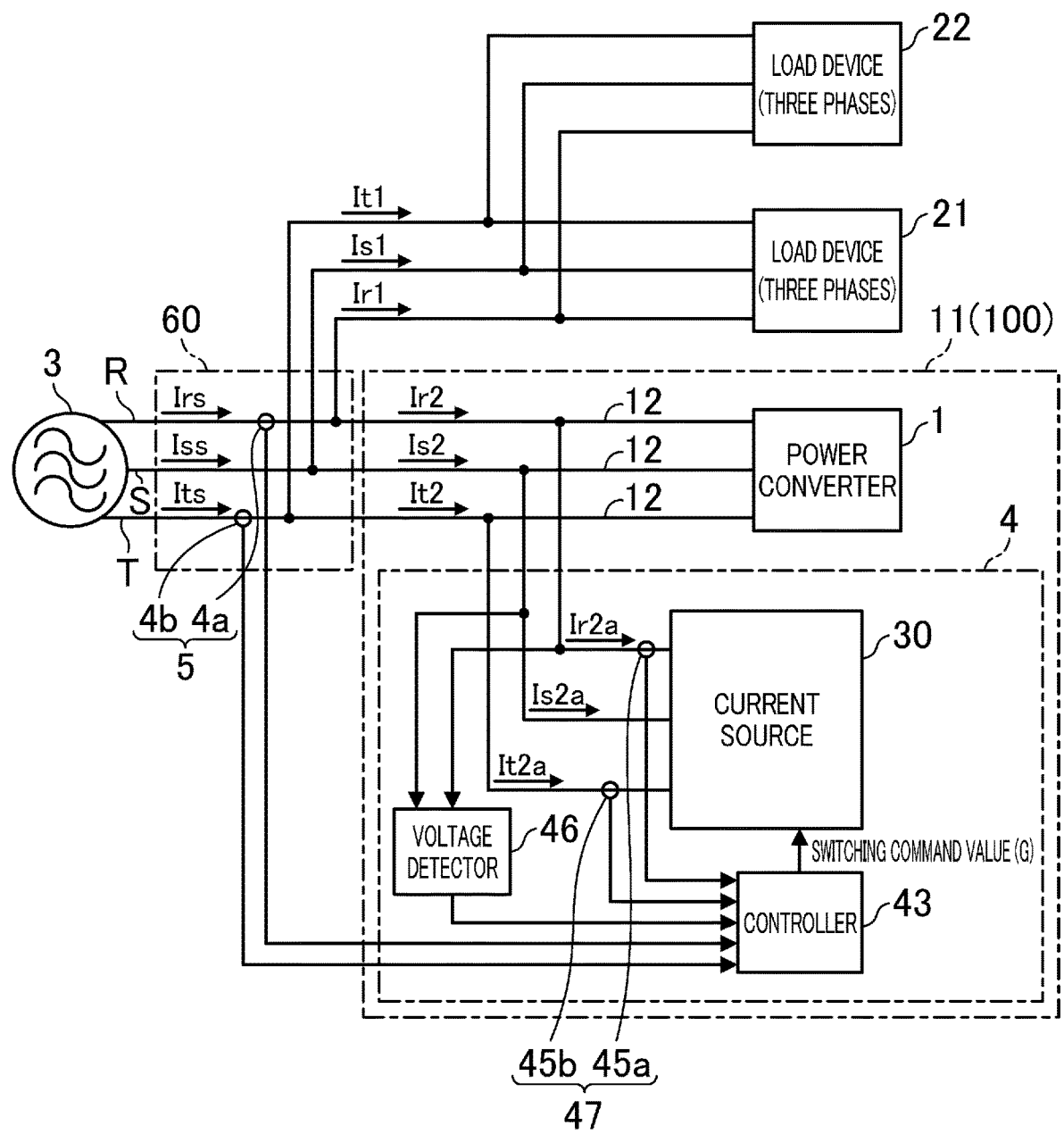
FIG. 4 is a block diagram illustrating an air conditioning system according to a third embodiment.

FIG. 4 is a block diagram illustrating an air conditioning system (100) according to a third embodiment of the present invention. The third embodiment is different from the first embodiment in that a plurality of load devices are connected to the power system as shown in FIG. 4. Specifically, a load device (22), which is a three-phase harmonics generating load device, and a load device (21), which is also a three-phase harmonics generating load device, are connected to the power system. That is, in this embodiment, two harmonics generating load devices (three phase) are provided in addition to the power converter (1). Even if two or more harmonics generating load devices (three phase) are connected, the same advantage can be obtained by the same control performed in the first embodiment. As can be seen, according to this embodiment, the harmonic current can be reduced in the power system connected to the air conditioner (11) and two or more additional load devices (21). Moreover, in this embodiment, the power factor of fundamental wave can also be corrected.

Fourth Embodiment

Figure 5:
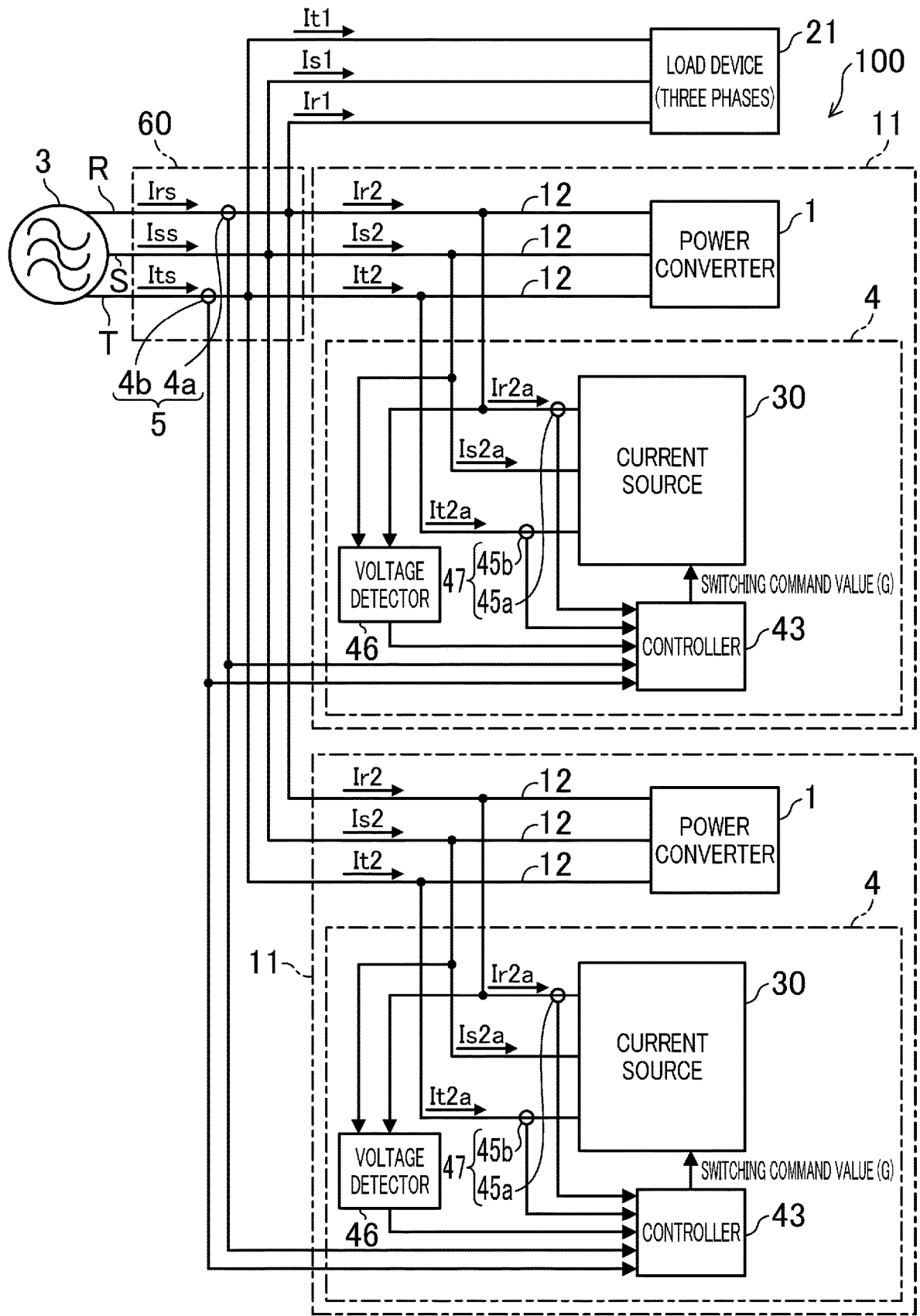
FIG. 5 is a block diagram illustrating an air conditioning system according to a fourth embodiment.

FIG. 5 is a block diagram illustrating an air conditioning system according to a fourth embodiment of the present invention. The fourth embodiment is different from the first embodiment in that a plurality of (two in this example) air conditioners (11, 11) are provided for the power system as shown in FIG. 5. In this example, each of the air conditioners (11, 11) includes an active filter (4). Providing two or more air conditioners (11) makes it possible to reduce the current burden capacity of the active filter (4). Therefore, in this embodiment, the current capacity of the active filter (4) can be reduced, thereby reducing the cost and size of the active filter (4).

Figure 6:
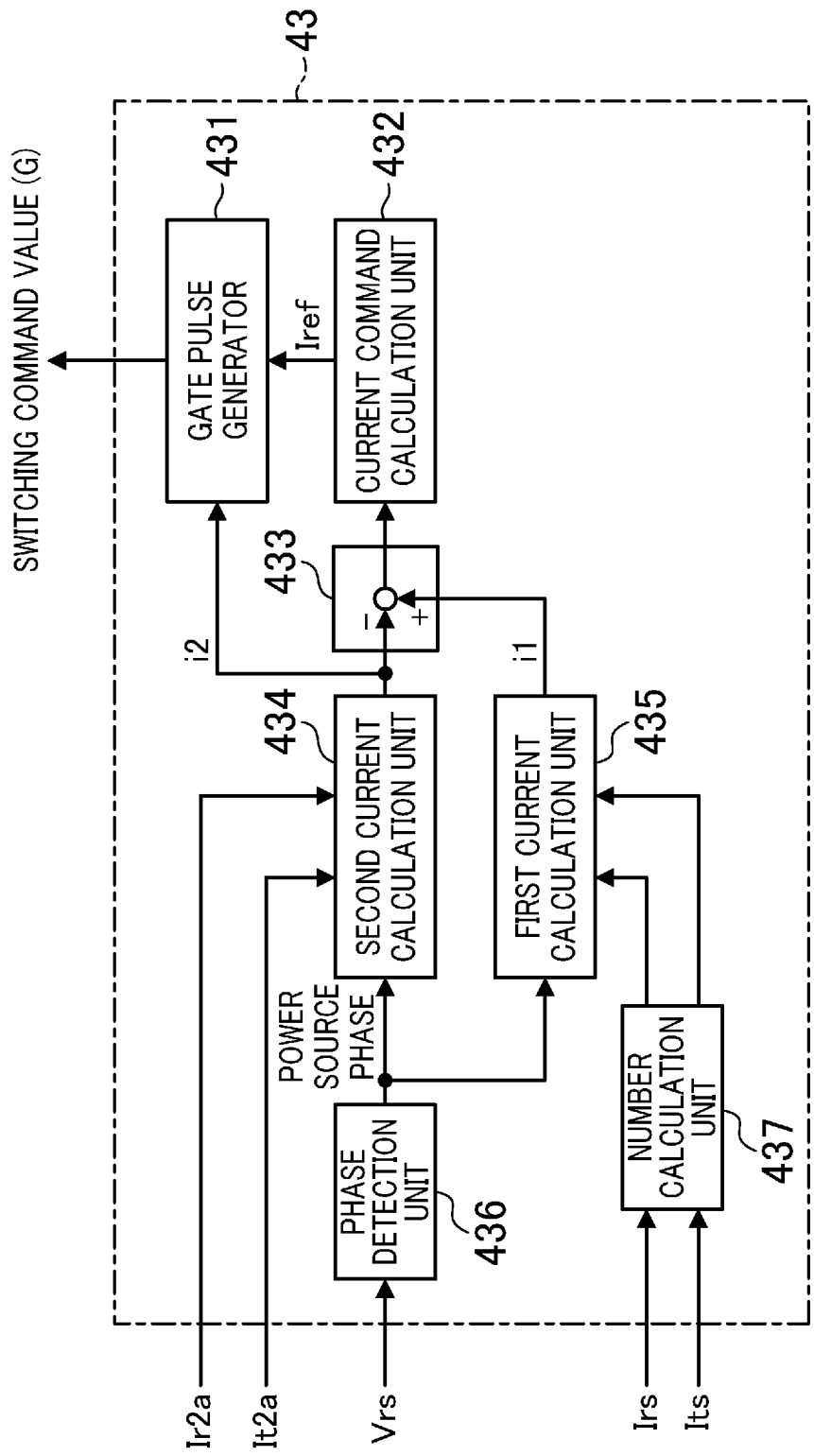
FIG. 6 is a block diagram illustrating a controller according to the fourth embodiment.

FIG. 6 shows an example of a block diagram of the controller (43) according to this embodiment. This embodiment is different from the first embodiment in that the values (Irs, Its) of the current with different phases flowing through the AC power source (3), detected by the current detectors (4a, 4b), are input to a number calculation unit (437) of the controller (43). In order to reduce the harmonic current of the load device (21), which is the harmonics generating load device, and correct its power factor, the number calculation unit (437) reflects the number of active filters (4) which reduces the harmonic current and corrects the power factor.

In this embodiment, two active filters (4) are provided for a single load device (21) (i.e., the harmonics generating load device). If the two active filters (4) have the same current capacity, the number calculation unit (437) divides each of the current values (Irs, Its) detected by the current detectors (4a, 4b) by two, and outputs the obtained values to the first current calculation unit (435). Such features make it possible to obtain the compensation current, of each phase, to be handled by a single active filter (4). In this example, the output power of each of the active filters (4) is half the compensation current output by a single active filter (4).

If the active filters (4) have mutually different current capacities, the number calculation unit (437) calculates, based on the current capacities, a current to be handled for each of the active filters (4). For example, suppose that one of the active filters (4) has a current capacity of 10 kW and the other active filter (4) has a current capacity of 50 kW, the number calculation unit (437) of the former active filter (4) divides each of the current values (Irs, Its) detected by the current detectors (4a, 4b) by six, and outputs the obtained values to the first current calculation unit (435). The first current calculation unit (435) outputs the first current value (i1) in accordance with the values transmitted from the number calculation unit (437). The number calculation unit (437) of the latter active filter (4) multiplies each of the current values (Irs, Its) detected by the current detectors (4a, 4b) with ⅚, and outputs the obtained values to the first current calculation unit (435). The first current calculation unit (435) outputs the first current value (i1) in accordance with the values transmitted from the number calculation unit (437). The output power of each of the active filters (4) is lower than the compensation current output by a single active filter (4).

As can be seen, according to this embodiment, the harmonic current can be reduced in the power system connected to a plurality of air conditioners (11, 11) and other load device (21). Moreover, in this embodiment, the power factor of fundamental wave can also be corrected.

Fifth Embodiment

Figure 7:
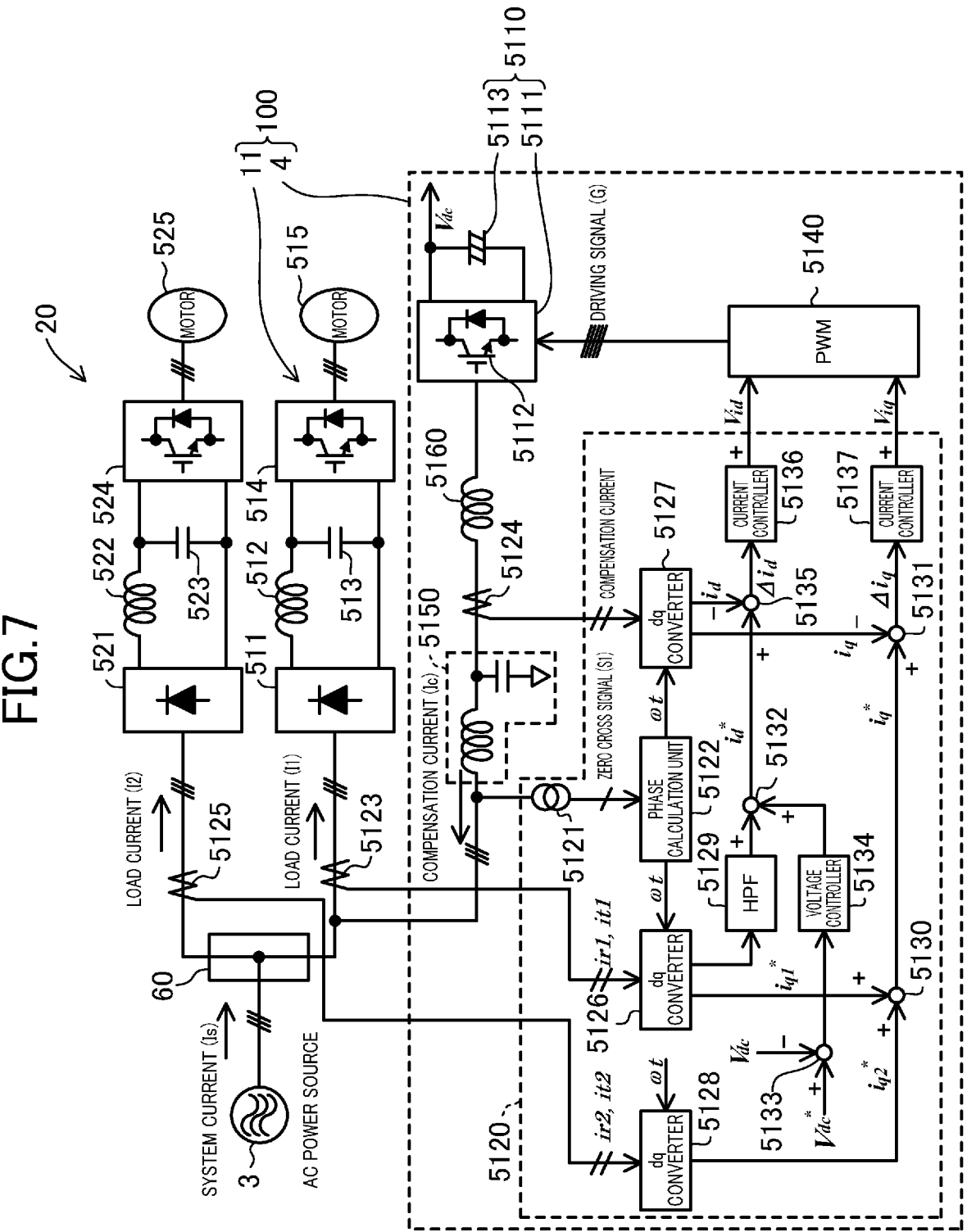
FIG. 7 is a block diagram illustrating an air conditioning system according to a fifth embodiment.

FIG. 7 is a block diagram illustrating an air conditioning system (100) according to a fifth embodiment of the present invention. The air conditioning system (100), which is an example of a device with a built-in active filter, incorporates an air conditioner (11) and an active filter (4). The air conditioning system (100) is installed in a building, a condominium, a factory, or a house (will be hereinafter simply referred to as a building or any other facility). The building or any other facility is supplied with electric power from a power system including an AC power source (3). In this example, the AC power source (3) is a three-phase AC power source (commercial power source).

The building or any other facility is provided with a distribution board (60) which is connected to the AC power source (3) and receives AC power from the AC power source (3). The distribution board (60) includes a plurality of breakers, via which the AC power from the AC power source (3) is divided into the plurality of devices. In this example, the air conditioning system (100) is connected to one of the breakers. The air conditioning system (100) is driven by the AC power supplied via the distribution board (60).

Specifically, the air conditioner (11) includes a refrigerant circuit (not shown) which performs a refrigeration cycle operation, and serves to cool or heat the room in the building or any other facility. The refrigerant circuit of the air conditioner (11) includes a compressor which compresses a refrigerant. As shown in FIG. 7, the air conditioner (11) includes a converter circuit (511), a reactor (512), a capacitor (513), an inverter circuit (514), and a motor (515).

The converter circuit (511) converts an alternating current to a direct current. For example, the converter circuit (511) is configured as a diode bridge circuit. The capacitor (513) smoothes the output of the converter circuit (511). Further, the inverter circuit (514) converts the direct current smoothed by the capacitor (513) into an alternating current having a predetermined frequency and a predetermined voltage. Specifically, the inverter circuit (514) includes a plurality of (six in this example) switching elements connected in a bridge manner, and converts the direct current into an alternating current by switching the input direct current.

The motor (515) of the air conditioner (11) is a so-called interior permanent magnet motor (IPM motor). The motor (515) drives the compressor. Here, if no action is made, a high harmonic current is applied to the electric current of the power system (will be hereinafter referred to as a "system current (Is)") when the motor (515) operates.

A load device (20) which is separate from the air conditioner (11) is also connected to one of the breakers. Examples of the load device (20) include an elevator. As shown in FIG. 7, the elevator includes a converter circuit (521), a reactor (522), a capacitor (523), an inverter circuit (524), and a motor (525). The converter circuit (521) is a circuit that converts an alternating current into a direct current, and has a configuration similar to that of the converter circuit (511) of the air conditioner (11). The capacitor (523) smoothes the output of the converter circuit (521). Further, the inverter circuit (524) converts the direct current smoothed by the capacitor (523) into an alternating current having a predetermined frequency and a predetermined voltage. The inverter circuit (524) is similar in configuration to the converter circuit (511). The motor (525) is also a so-called IPM motor, and drives the elevator. Here, if no action is made, a harmonic current is applied to the system current (Is) when the motor (525) operates.

<Configuration of Active Filter>

As shown in FIG. 7, the active filter (4) includes a current source (5110), a power factor controller (5120), and a PWM controller (5140). In this example, the active filter (4) is incorporated into the air conditioning system (100) together with the air conditioner (11). The active filter (4) provides a compensation current (Ic) to be described later to the power source system to correct a power factor and to reduce a harmonic wave of the air conditioner (11). Here, in this case, as an example, the compensation current (Ic) is assumed to be positive in a direction from the active filter (4) toward the AC power source (3). Further, the sum of the system current (Is) and the compensation current (Ic) is assumed to be equal to the sum of the current (load current (I1)) flowing from the power source system (AC power source (3)) to the air conditioner (11) and the current (load current (I2)) flowing from the power source system (power source (3)) to the load device (20).

—Current Source (5110)—

The current source (5110) includes an inverter circuit (5111) and a capacitor (5113). The capacitor (5113) is, for example, an electrolytic capacitor. The inverter circuit (5111) inputs and outputs a compensation current (Ic) so as to charge and discharge the capacitor (5113). In this example, the inverter circuit (5111) is connected to the AC power source (3) via a three-phase reactor (5160).

In the inverter circuit (5111) of this embodiment, although not shown in detail, six switching elements (5112) are bridge-connected. The inverter circuit (5111) changes the switching state (ON/OFF state) of the switching elements (5112) in synchronization with a carrier signal of a predetermined frequency, and inputs and outputs the compensation current (Ic). The ON/OFF control of the switching elements (5112) is performed by the PWM controller (5140). In this example, for the purpose of removing a ripple of the compensation current (Ic), a low-pass filter (5150) is provided between the reactor (5160) and the connection point of the breaker and the air conditioner (11). The low-pass tilter (5150) is a so-called LC filter.

—Power Factor Controller (5120)—

The power factor controller (5120) includes a power source phase detector (5121), a phase calculation unit (5122), three current sensors (5123, 5124, 5125), three dq converters (5126, 5127), a high-pass filter (5129), two adders (5130, 5132), three subtractors (5131, 5133, 5135), a voltage controller (5134), and two current controllers (5136, 5137). In particular, the main part of the power factor controller (5120) may be comprised of a microcomputer, a memory device in which software for operating the microcomputer is stored, and the like.

The power source phase detector (5121) is connected between predetermined lines (two of the r phase, the s phase, and the t phase) of the AC power source (3), detects the phase of the line-to-line voltage, and outputs the phase to the phase calculation unit (5122). The phase calculation unit (5122) obtains a phase ($\omega t$) between lines to which the power source phase detector (5121) is connected, using a signal (will be referred to as a "zero cross signal (S1)") output from the power source phase detector (5121). The phase calculation unit (5122) outputs the obtained phase ($\omega t$) to the dq converter (5126), the dq converter (5127), and the dq converter (5128).

The current sensor (5123) is provided outside the air conditioning system (100) and detects a load current (I1). While the load current (I1) has three phases, the current sensor (5123) detects the load currents (ir1, it1) for two phases out of the three phases. The current sensor (5124) detects the compensation current (Ic). Although the compensation current (Ic) also has three phases, the current sensor (5124) detects the load currents for two phases out of the three phases. Further, the current sensor (5125) is provided outside of the air conditioning system (100) and detects the load current (I2). Although the load current (I2) also has three phases, the current sensor (5125) detects the load currents (ir2, it2) for two phases out of the three phases. Note that, if the current values of two phases out of three phases, of the load currents (I1, I2) and the compensation current (Ic), are detected, the current value of the remaining one phase can be easily calculated. Thus, each of the current sensors (5123, 5124, 5125) may be configured to detect currents for two phases. In addition, current sensors of various configurations may be used as the current sensors (5123, 5124, 5125). As an example of these current sensors (5123, 5124, 5125), a current transformer may be used. It is also possible to transmit the value detected by the current sensor (5125) to the dq converter (5128) in a wireless manner.

The dq converter (5126) performs a three-phase/two-phase conversion (dq axis conversion) on the load currents (I1) (three phases) obtained from the detection value of the current sensor (5123). Here, the d-axis and q-axis represent a rotation coordinate system rotating in synchronization with the phase ($\omega t$) obtained by the phase calculation unit (5122). The q-axis component (will be hereinafter referred to as a "q-axis component (iq1*)") obtained as a result of conversion by the q-axis converter (5126) is a reactive current in the air conditioner (11). On the other hand, the d-axis component obtained as a result of the conversion is an effective current in the air conditioner (11). The dq converter (5126) outputs the q-axis component (iq1*) to the adder (5130), and outputs the d-axis component to the high-pass filter (5129).

The dq converter (5127) performs a three-phase/two-phase conversion on the compensation current (Ic) obtained from the value detected by the current sensor (5124) to obtain a d-axis component (will be hereinafter referred to as a "d-axis current (id)") as an effective current and a q-axis component (will be hereinafter referred to as a "q-axis current (iq)") as a reactive current, and outputs the d-axis current (id) to the subtractor (5135), and the q-axis current (iq) to the subtractor (5131).

Further, the dq converter (5128) performs the three-phase/two-phase conversion on the load current (I2) (three phases) obtained from the detection value of the current sensor (5125), and obtains a q-axis component (iq2*). The q-axis component (iq2*) is a reactive current of the load device (20). The q-axis component (iq2*) obtained by the dq converter (5128) is output to the adder (5130). Thus, an added value of the q-axis component (iq1*) and the q-axis component (iq2*) is output from the adder (5130). This added value may be interpreted as a total value of reactive currents in a building or any other facility in which the active filter (4) is installed. That is, this added value may be considered as the q-axis component of the current to be supplied as the compensation current (Ic). Hereinafter, this added value will be referred to as a "q-axis current command value (iq*)."

The high-pass filter (5129) removes a DC component from the d-axis component of the load current (I1) output by the dq converter (5126), and outputs the DC component to the adder (5132). The output of the dq converter (5126) becomes a direct current if no harmonic component is present in the load current (I1). This is because a component of the load current (I1) that is synchronized with the phase of the AC power source (3) appears as a direct current. In other words, the high-pass filter (5129) outputs only the harmonic component included in the d-axis component of the load current (I1) to the adder (5132).

If the compensation current (Ic) is supplied so that each of the d-axis component and the q-axis component in the compensation current (Ic) coincides with the harmonic component of the load current (I1), the harmonic component of the load current (I1) can be canceled out. In this way, supplying a current to cancel a predetermined component will be hereinafter referred to as "compensation." That is, the output of the high-pass filter (5129) can be used to generate a command value (d-axis current command value (id*)) of the d-axis component (d-axis current (id)) of the compensation current (Ic).

On the other hand, the q-axis component (iq1*) of the load current (I1) output from the dq converter (5126) also includes a DC component. Therefore, superimposing the current corresponding to the q-axis component (iq1*) on the compensation current (Ic) makes it possible to correct the power factor of fundamental wave, in addition to reduce the harmonic component included in the load current (I1).

In addition, in this example, as the d-axis current command value (id*), the output of the high-pass filter (5129) is not used as it is. In addition, the output is corrected to conform with the variation of the voltage between terminals of the capacitor (5113) (will be hereinafter referred to as a DC voltage (Vdc)). Specifically, in the power factor controller (5120), the subtractor (5133) first obtains a deviation between the DC voltage (Vdc) of the capacitor (5113) and the command value (Vdc*) thereof. The voltage controller (5134) performs a proportional integral control in accordance with the deviation obtained by the subtractor (5133) to obtain a correction value. This correction value is added to the output of the high-pass filter (5129) in the adder (5132), and the result of the addition is output as the d-axis current command value (id*). Thus, the influence of the fluctuation of the DC voltage (Vdc) is reduced.

The subtractor (5135) obtains a deviation (Δid) obtained through subtraction of the d-axis current (id) from the d-axis current command value (id*), and outputs the deviation (Δid) to the current controller (5136). Further, the subtractor (5131) obtains a deviation (Δiq) obtained through subtraction of the q-axis current (iq) from the q-axis component (iq1*), and outputs the deviation (Δiq) to the current controller (5137).

The current controller (5136) outputs a d-axis voltage command value (Vid), which is one of the two-phase voltage command values, using an algorithm such as a feedback control (e.g., a so-called PID control) based on the deviation (Δid). Further, the current controller (5137) outputs a q-axis voltage command value (Viq), which is one of the two-phase voltage command values, using an algorithm such as feedback control (e.g., a so-called PID control) based on the deviation (Δiq).

—PWM Controller (5140)—

The PWM controller (5140) generates a switching command value (driving signal (G)) for driving the current source (5110) based on the d-axis voltage command value (Vid) and the q-axis voltage command value (Viq). Specifically, the PWM controller (5140) performs a so-called pulse width modulation (PWM) control, and causes the current source (5110) to input and output the compensation current (Ic). The PWM controller (5140) may include a microcomputer and a memory device in which software for operating the microcomputer is stored.

(Operation of Active Filter)

Since the active filter (4) is incorporated in the air conditioning system (100), the air conditioning system (100) is supplied with power to activate the active filter (4). Then, in the active filter (4), the q-axis component (iq1*) of the load current (I1) is obtained in the power factor controller (5120) in accordance with the value detected by the current sensor (5123) and the like. Further, based on the value detected by the current sensor (5125), the q-axis component (iq2*) is obtained by the dq converter (5128).

The q-axis component (iq1*) of the load current (I1) and the q-axis component (iq2*) of the load current (I2) are added by the adder (5130), and the added components are output as a q-axis current command value (iq*). From this q-axis current command value (iq*), the q-axis current (iq) obtained by the dq converter (5127) is subtracted by the subtractor (5131), and is output as a deviation (Δiq).

Further, the power factor controller (5120) generates a d-axis current command value (id*) through an operation of the dq converter (5126), for example. From this d-axis current command value (id*), the d-axis current (id) obtained by the dq converter (5127) is subtracted by the subtractor (5135), and is output as a deviation (Δid).

Once the deviation (Δid) is determined, a d-axis voltage command value (Vid) is output from the current controller (5136). Further, once the deviation (Δiq) is determined, the q-axis voltage command value (Viq) is output from the current controller (5137). Thus, the driving signal (G) corresponding to the d-axis voltage command value (Vid) and the q-axis voltage command value (Viq) is output from the PWM controller (5140) to the inverter circuit (5111). As a result, a compensation current (Ic) having a component corresponding to the d-axis current command value (id*) and the q-axis current command value (iq*) flows from the current source (5110). Such features reduce the harmonic current generated by the air conditioner (11) and correct the power factor of fundamental wave in the system current (Is).

Advantages of Embodiment

As described above, in this embodiment, for the air conditioner (11), the harmonic component of the effective current and the reactive current in the air conditioner (11) are compensated to achieve both the reduction of the harmonic current and the correction of the power factor. On the other hand, for the other load device (20) connected to the same power system to which the air conditioner (11) is connected, the power factor is corrected (compensated) based only on the reactive current in the other load service (20), and the effective current is not compensated. In other words, the active filter (4) does not compensate the effective current in the other load device (20), and thus does not have to have the capacity for the compensation. Accordingly, in the case where the other load device (20) as well as the air conditioner (11) is connected to the power system, this embodiment can correct the power factor without increasing the capacity of the active filter (4). This embodiment is useful in correcting the power factor of the entire building or any other facility, utilizing the reserve capacity of the active filter (4) incorporated in the air conditioner (11).

Variation of Fifth Embodiment

Figure 8:
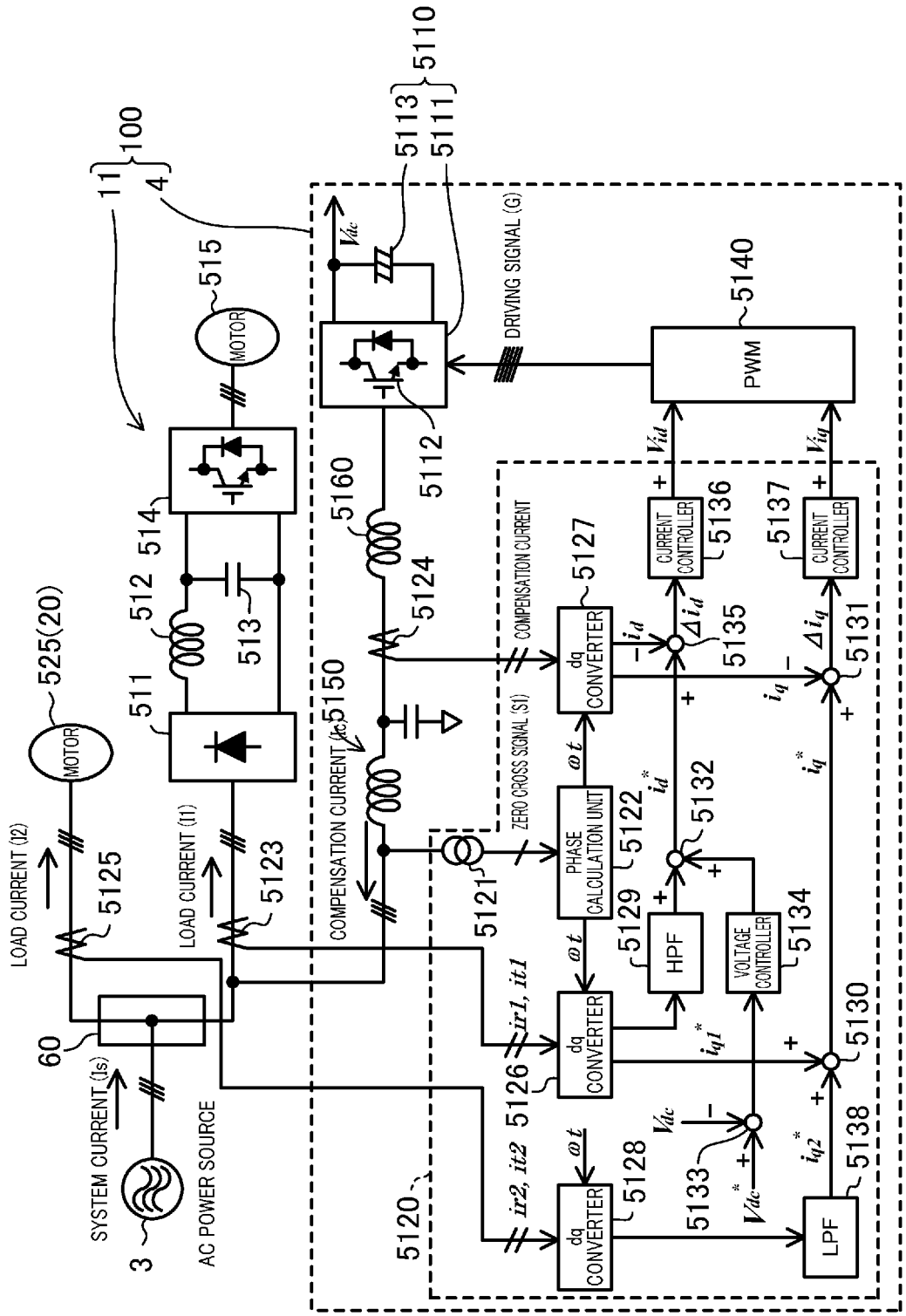
FIG. 8 is a block diagram illustrating an air conditioning system according to a variation of the fifth embodiment.

FIG. 8 is a block diagram showing the air conditioning system (100) according to a variation of the fifth embodiment. As shown in FIG. 8, the air conditioning system (100) includes the active filter (4) of the fifth embodiment and a low-pass filter (5138) added to the active filter (4). In this example, the air conditioning system (100) is provided with an inductive motor (525) as a load device (20) separate from the air conditioner (11). A current of the inductive motor (525) does not include a harmonic component. Also in this case, if no action is made, the system current (Is) enters a lagging phase.

In this variation, as shown in FIG. 8, the q-axis component of the dq converter (5128) is output as the q-axis component (iq2*) through the low-pass filter (5138). Therefore, in this variation, compensated is only a component of a fundamental wave component of the reactive current of the load device (20). That is, this variation is useful when the reactive current of the other load device (20) does not include a harmonic component.

Sixth Embodiment

Figure 9:
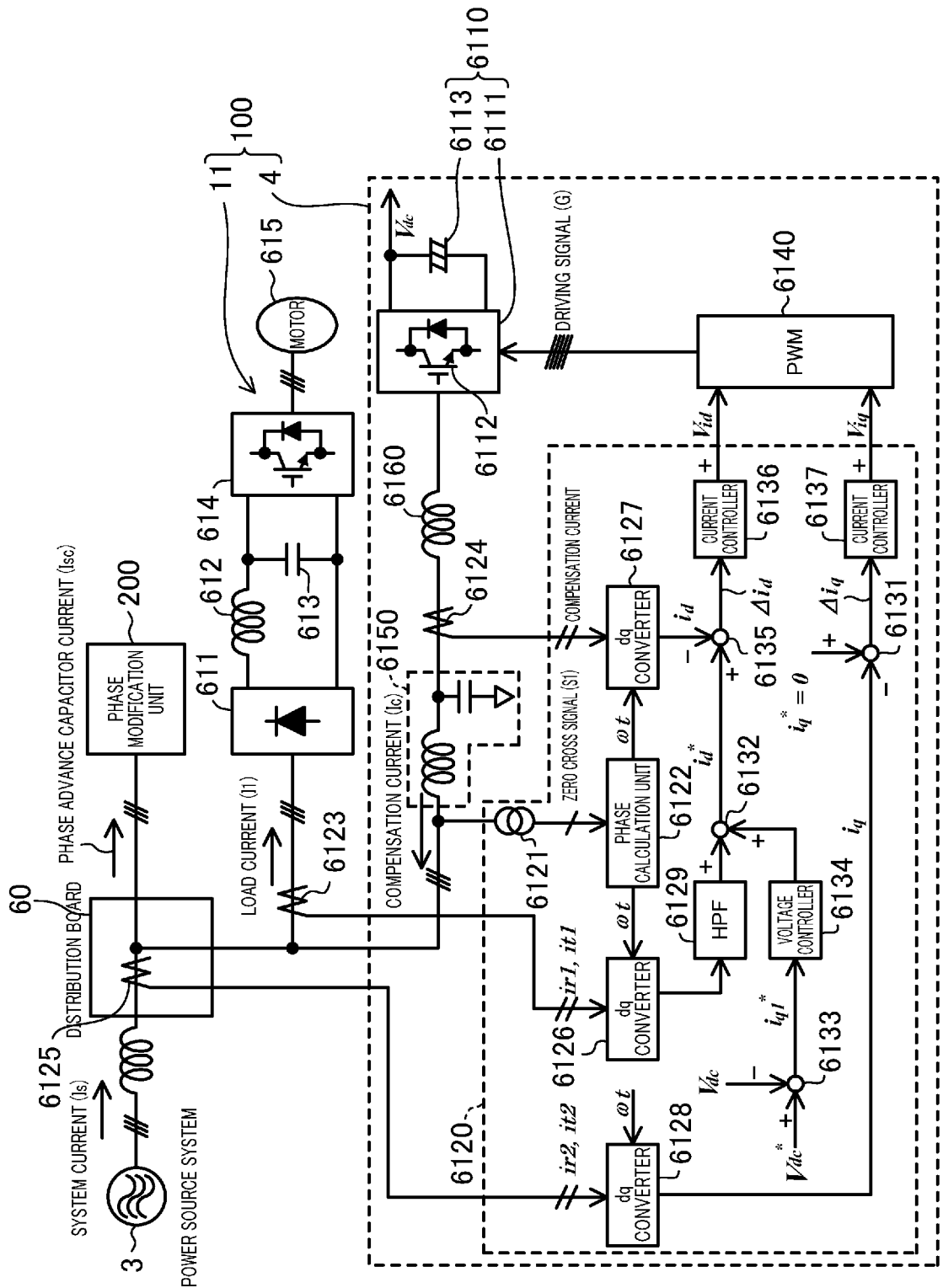
FIG. 9 is a block diagram illustrating an air conditioning system according to a sixth embodiment.

FIG. 9 is a block diagram illustrating the air conditioning system (100) according to a sixth embodiment of the present invention. The air conditioning system (100), which is an example of a device with a built-in active filter, incorporates the air conditioner (11) and the active filter (4). The air conditioning system (100) is installed in a facility such as a building, a factory, or a condominium. The building or any other facility is supplied with electric power from a power system including the AC power source (3). In this example, the AC power source (3) is a three-phase AC power source (commercial power source). Note that the power grid of the power system has impedance. (FIG. 9 shows a symbol of a coil between the AC power source (3) and the distribution board (60) (to be described later) to indicate this impedance.) Due to the presence of a phase modification unit (200), the current tends to enter the leading phase when the electric power is supplied from the AC power source (3) to the distribution board (60), and the presence of the impedance bring the power reception voltage at the distribution board (60) higher than the voltage of the AC power source.

The building or any other facility is provided with the distribution board (60) which is connected to the AC power source (3) and receives AC power from the AC power source (3). The distribution board (60) includes a plurality of breakers, via which the AC power from the AC power source (3) is divided into the plurality of devices. In this example, the air conditioning system (100) is connected to one of the breakers. The air conditioning system (100) is driven by the AC power supplied via the distribution board (60).

Specifically, the air conditioner (11) includes a refrigerant circuit (not shown) which performs a refrigeration cycle operation with a refrigerant circulating therein, and serves to cool or heat the room in the building or any other facility. The refrigerant circuit of the air conditioner (11) includes a compressor which compresses a refrigerant. As shown in FIG. 9, the air conditioner (11) includes a converter circuit (611), a reactor (612), a capacitor (613), an inverter circuit (614), and a motor (615).

The converter circuit (611) converts an alternating current to a direct current. For example, the converter circuit (611) is configured as a diode bridge circuit. The capacitor (613) smoothes the output of the converter circuit (611). Further, the inverter circuit (614) converts the direct current smoothed by the capacitor (613) into an alternating current having a predetermined frequency and a predetermined voltage. Specifically, the inverter circuit (614) includes a plurality of (six in this example) switching elements connected in a bridge manner, and converts the direct current into an alternating current by switching the input direct current.

The motor (615) of the air conditioner (11) is a so-called interior permanent magnet (IPM) motor. The motor (615) drives the compressor. Here, if no action is made, a high harmonic current is applied to the electric current of the electric power system (will be hereinafter referred to as a "system current (Is)") when the motor (615) operates. In other words, the air conditioner (11) is an example of a harmonics generator. Although not shown, in the building or any other facility, a load device (e.g., an elevator) other than the air conditioner (11) also receives the power via the distribution board (60).

Figure 10:
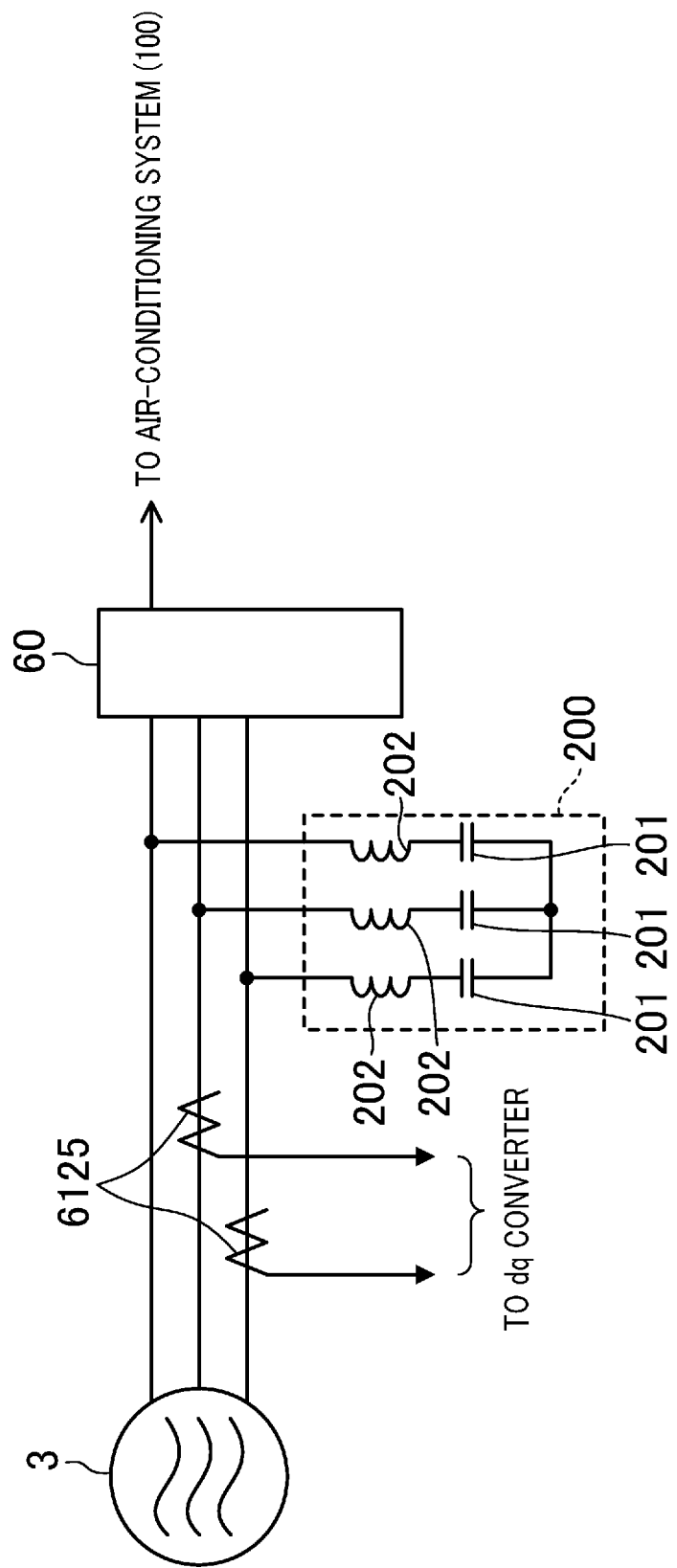
FIG. 10 is a block diagram schematically illustrating a configuration of a phase modifier.

In addition, a phase modification unit (200) is provided in the building or any other facility. FIG. 10 schematically shows a configuration of the phase modification unit (200). As shown in FIG. 10, the phase modification unit (200) includes three sets (for three phases) of series units each including a leading phase capacitor (201) and a reactor (202) connected in series. As shown in FIG. 10, each of the series units is provided at an input side of the distribution board (60). More specifically, the series units are connected to a predetermined one phase of an AC power source (3) at one end, and connected to each other at the other end. In the following description, a current flowing through the phase modification unit (200) will be referred to as a "phase advance capacitor current (Isc)."

<Configuration of Active Filter>
As shown in FIG. 9, the active filter (4) includes a current source (6110), a power factor controller (6120), and a PWM controller (6140). In this example, the active filter (4) is incorporated into the air conditioning system (100) together with the air conditioner (11). The active filter (4) provides the power source system with a compensation current (Ic) to be described later in order to correct the power factor and reduce a harmonic wave of the air conditioner (11). Here, in this case, as an example, the compensation current (Ic) is assumed to be positive in a direction from the active filter (4) toward the AC power source (3). Further, the sum of the system current (Is) and the compensation current (Ic) is assumed to be equal to the sum of the current (load current (I1)) flowing from the power source system (AC power source (3)) to the air conditioner (11) and the phase advance capacitor current (Isc) flowing through the phase modification unit (200).

—Current Source (6110)—

The current source (6110) includes an inverter circuit (6111) and a capacitor (6113). The capacitor (6113) is composed of, for example, an electrolytic capacitor. The inverter circuit (6111) inputs and outputs a compensation current (Ic) so as to charge and discharge the capacitor (6113). In this example, the inverter circuit (6111) is connected to the AC power source (3) via a three-phase reactor (6160).

In the inverter circuit (6111) of this embodiment, although not shown in detail, six switching elements (6112) are bridge-connected. The inverter circuit (6111) changes the switching state (ON/OFF state) of the switching elements (6112) in synchronization with a carrier signal of a predetermined frequency, and inputs and outputs the compensation current (Ic). The ON/OFF control of the switching elements (6112) is performed by the PWM controller (6140). In this example, for the purpose of removing a ripple of the compensation current (Ic), a low-pass filter (6150) is provided between the reactor (6160) and the connection point of the breaker and the air conditioner (11). The low-pass filter (6150) is a so-called LC filter.

—Power Factor Controller (6120)—

The power factor controller (6120) includes a power source phase detector (6121), a phase calculation unit (6122), three current sensors (6123, 6124, 6125), three dq converters (6126, 6127, 6128), a high-pass filter (6129), an adder (6132), three subtractors (6131, 6133, 6135), a voltage controller (6134), and two current controllers (6136, 6137). In particular the main part of the power factor controller (6120) may include a microcomputer, and a memory device in which software for operating the microcomputer is stored.

The power source phase detector (6121) is connected between predetermined lines (two of the r phase, the s phase, and the t phase) of the AC power source (3), detects the phase of the line-to-line voltage, and outputs the phase to the phase calculation unit (6122). The phase calculation unit (6122) obtains a phase (wt) between lines to which the power source phase detector (6121) is connected, using a signal (will be referred to as a "zero cross signal (S1)") output from the power source phase detector (6121). The phase calculation unit (6122) outputs the obtained phase (wt) to a dq converter (6126), a dq converter (6127), and a dq converter (6128).

A current sensor (6123) is provided outside the air conditioning system (100) and detects a load current (I1). While the load current (I1) has three phases, the current sensor (6123) detects the load currents (ir1, it1) for two phases out of the three phases. A current sensor (6124) detects the compensation current (Ic). Although the compensation current (Ic) also has three phases, the current sensor (6124) detects the load currents for two phases out of the three phases.

The current sensor (6125) is an example of a load information detection unit, and detects the system current (Is). Here, the system current (Is) is a current for the entire building including the phase modification unit (200). In this example, the current sensor (6125) is provided in the distribution board (60). In other words, the current sensor (6125) is provided outside the air conditioning system (100). The current sensor (6125) detects a current value (the system current (Is)) at the input side of the distribution board (60) and closer to the AC power source (3) than the phase modification unit (200) is to the AC power source (3). While the system current (Is) also has three phases, the current sensor (6125) detects the system currents (ir2, it2) for two phases of the three phases. The value (system current (Is)) detected by the current sensor (6125) is wirelessly transmitted to the dq converter (6128). As a matter of course, the value detected by the current sensor (6125) may also be transmitted to the dq converter (6128) in a wired manner.

Regarding the load current (I1), the system current (Is), and the compensation current (Ic), if the current values for two phases out of the three phases are detected, the current value of the remaining one phase can be easily calculated. Thus, each of the current sensors (6123, 6124, 6125) may be configured to detect a current for two phases. In addition, current sensors of various configurations may be used for the current sensors (6123, 6124, 6125). As an example of these current sensors (6123, 6124, 6125), a current transformer may be used.

The dq converter (6126) performs a three phase/two phase conversion (dq axis conversion) on the load current (I1) (having three phases) obtained from a value detected by the current sensor (6123). Here, the d-axis and the q-axis are rotational coordinate systems which rotate in synchronization with the phase (ωt) obtained by the phase calculation unit (6122). The d-axis component obtained as a result of the conversion is an effective current in the air conditioner (11), and the dq converter (6126) outputs the d-axis component to the high-pass filter (6129). Note that the q-axis component obtained as a result of the conversion of the dq converter (6126) is a reactive current in the air conditioner (11). However, in this embodiment, this q-axis component is not used for control.

The dq converter (6127) performs a three phase/two phase conversion on the compensation current (Ic) obtained from the value detected by the current sensor (6124), and obtains a d-axis component (hereinafter referred to as a "d-axis current (id)") which is an effective current and a q-axis component which is a reactive current. The d-axis current (id) is output to the subtractor (6135). In this embodiment, the q-axis current obtained by the dq converter (6127) is not used for the control.

Further, the dq converter (6128) performs the three phase/two phase conversion on the system current (Is) (having three phases) obtained from the value detected by the current sensor (6125), and obtains a q-axis component (hereinafter referred to as a "q-axis current (iq)"). The q-axis current (iq) is a reactive current in the received electric power. In other words, the q-axis current (iq) may be interpreted as a total value of reactive currents in the building or any other facility in which the active filter (4) is installed. That is, the q-axis current (iq) may be interpreted as the q-axis component of the current to be supplied as the compensation current (Ic). The q-axis current (iq) obtained by the q-axis converter (6128) is output to the subtractor (6131). In this embodiment, the d-axis current obtained by the dq converter (6128) is not used for the control.

The high-pass filter (6129) removes a DC component from the d-axis component of the load current (I1) output by the dq converter (6126), and outputs the DC component to the adder (6132). The output of the dq converter (6126) becomes a direct current if no harmonic component is found in the load current (I1). This is because a component of the load current (11) that is synchronized with the phase of the AC power source (3) appears as a direct current. In other words, the high-pass filter (6129) outputs only the harmonic component included in the d-axis component of the load current (I1) to the adder (6132).

If the compensation current (Ic) is supplied so that each of the d-axis component and the q-axis component in the compensation current (Ic) coincides with the harmonic component of the load current (I1), the harmonic component of the load current (I1) can be canceled out. In this way, supplying a current to cancel a predetermined component will be hereinafter referred to as "compensation." That is, the output of the high-pass filter (6129) can be used to generate a command value (d-axis current command value (id*)) of the d-axis component (d-axis current (id)) of the compensation current (Ic).

In addition, in this example, as the d-axis current command value (id*), the output of the high-pass filter (6129) is not used as it is. In addition, the output is corrected to conform with the variation of the voltage between terminals of the capacitor (6113) (hereinafter, referred to as a "DC voltage (Vdc)"). Specifically, in the power factor controller (6120), the subtractor (6133) first obtains a deviation between the DC voltage (Vdc) of the capacitor (6113) and the command value (Vdc*) thereof. The voltage controller (6134) performs a proportional integral control in accordance with the deviation obtained by the subtractor (6133) to obtain a correction value. This correction value is added to the output of the high-pass filter (6129) in the adder (6132), and the result of the addition is output as the d-axis current command value (id*). Thus, the influence of the fluctuation of the DC voltage (Vdc) is reduced.

The subtractor (6135) obtains a deviation (Δid) obtained through subtraction of the d-axis current (id) from the d-axis current command value (id*), and outputs the deviation (Δid) to the current controller (6136). Further, a fixed value (specifically, zero) is input to the subtractor (6131) as a q-axis current command value (iq*). From the subtractor (6131), a value obtained through subtraction of the q-axis current (iq) from the q-axis current command value (iq*) (hereinafter, referred to as a deviation (Δiq)) is output. The deviation (Δid) is input into the current controller (6137).

The current controller (6136) outputs a d-axis voltage command value (Vid), which is one of the two phase voltage command values, using an algorithm such as a feedback control (e.g., a so-called PID control) based on the deviation (Δid). Further, the current controller (6137) outputs a q-axis voltage command value (Viq), which is one of the two phase voltage command values, using an algorithm such as feedback control (for example, a so-called PID control) based on the deviation (Δiq).

—PWM Controller (6140)—

The PWM controller (6140) generates a switching command value (driving signal (G)) for driving the current source (6110) based on the d-axis voltage command value (Vid) and the q-axis voltage command value (Viq). Specifically, the PWM controller (6140) performs a so-called pulse width modulation (PWM) control, and causes the current source (6110) to input and output the compensation current (Ic). The PWM controller (6140) may include a microcomputer and a memory device in which software for operating the microcomputer is stored.

(Operation of Active Filter)

Since the active filter (4) is incorporated in the air conditioning system (100), the air conditioning system (100) is supplied with power to activate the active filter (4). Then, in the power factor controller (6120), based on the value detected by the current sensor (6125), the q-axis current (iq) of the system current (Is) is obtained by the dq converter (6128). Further, the subtractor (6131) subtracts the q-axis current command value (iq*) from the q-axis current (iq) to calculate the deviation (Δiq). Moreover, in the power factor controller (6120), the d-axis current command value (id*) is generated by an operation of the dq converter (6126), for example. Further, the subtractor (6135) subtracts the d-axis current (id) obtained by the dq converter (6127) from the d-axis current command value (id*) to calculate the deviation (Δid).

Once the deviation (Δid) is determined, the d-axis voltage command value (Vid) is output from the current controller (6136). Further, once the deviation (Δiq) is determined, the q-axis voltage command value (Viq) is output from the current controller (6137). Thus, the driving signal (G) corresponding to the d-axis voltage command value (Vid) and the q-axis voltage command value (Viq) is output from the PWM controller (6140) to the inverter circuit (6111).

For example, supposed that the active filter (4) is not provided. If the load of the air conditioner (11) is small, the system current (Is) enters the leading phase by the phase advance capacitor current (Isc). However, in this embodiment, the q-axis voltage command value (Viq) is generated so that the q-axis component (q-axis current (iq)) in the system current (Is) becomes zero (=q-axis current command value (iq*)). Accordingly, the compensation current (Ic), which has a component corresponding to the q-axis current (iq), flows from the current source (6110). As a result, in this embodiment, the phase advance capacitor current (Isc) in the leading phase is compensated, and the power factor of fundamental wave of the received power is corrected.

In addition, with respect to the air conditioner (11), the d-axis component of the compensation current (Ic) is adjusted so as to compensate for the harmonic component of the load current (I1). Therefore, the harmonic component of the effective current of the air conditioner (11) is also compensated. In other words, the active filter (4) is also capable of reducing a harmonic current of the air conditioner (11).

Advantages of Embodiment

As described above, in this embodiment, the reactive currents of the entire building and any other facility including the phase modification unit (200) is determined, and the reactive currents are compensated. Therefore, this embodiment makes it possible to correct a power factor in the building or any other facility having a phase modifier.

Seventh Embodiment

Figure 11:
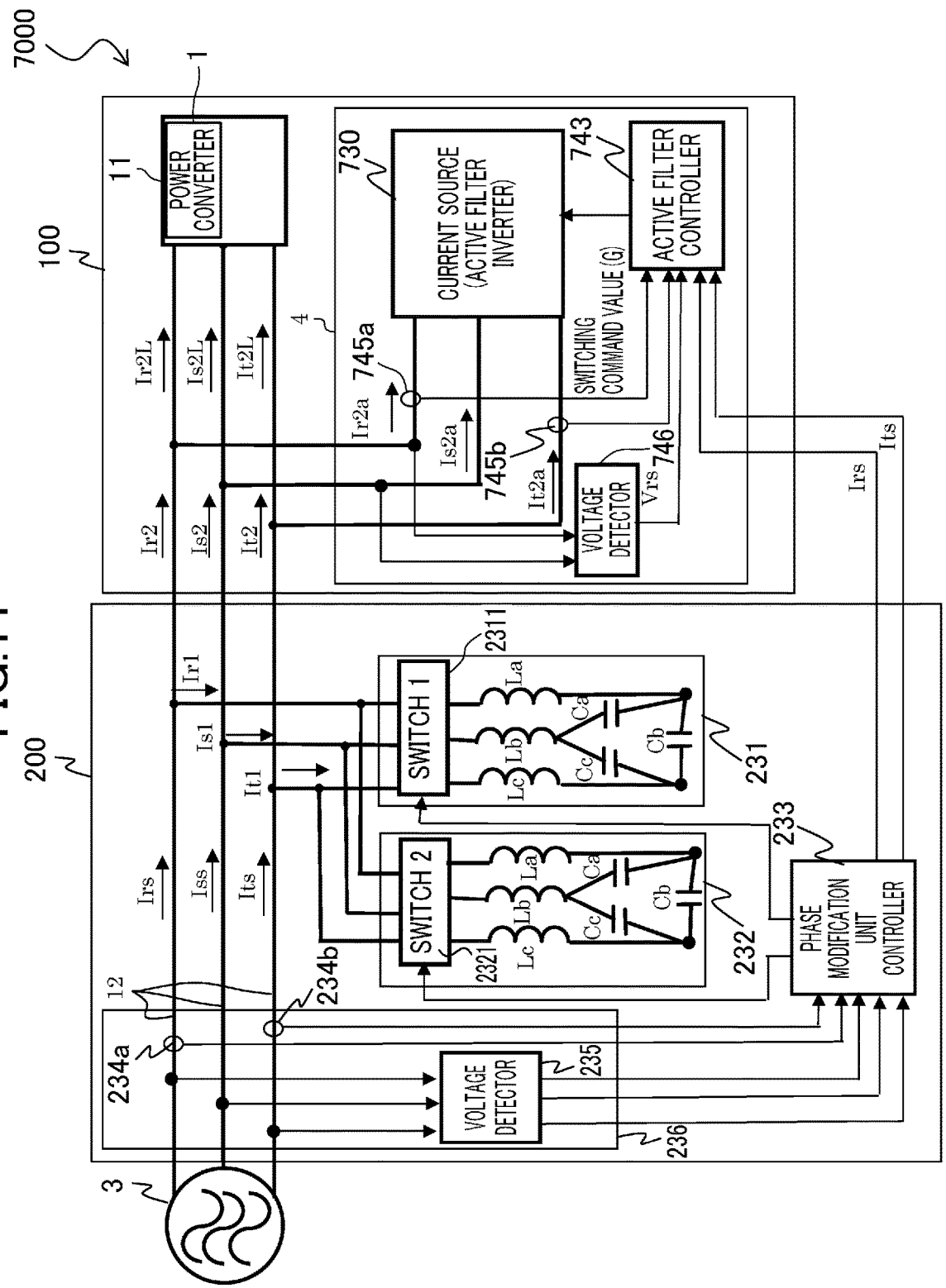
FIG. 11 is a block diagram illustrating a configuration of a power source power factor control system according to a seventh embodiment.

FIG. 11 is a block diagram illustrating a configuration of a power source power factor control system (7000) according to a seventh embodiment of the present invention. The power source power factor control system (7000) includes the phase modification unit (200) and the air conditioning system (100).

The air conditioning system (100) is installed in a facility such as a building or a house (hereinafter, referred to as a building or any other facility), and conditioning (cooling or heating) air in a room by the air conditioner (11). Electric power is supplied to the building or any other facility from a power system including the AC power source (3). In this example, the AC power source (3) is a three-phase AC power source (e.g., a three-phase commercial power source), and supplies power to the air conditioning system (100) that is a harmonics generating load device. The air conditioning system (100) is driven by the AC power supplied from the AC power source (3).

The phase modification unit (200) is provided to the building or any other facility in order to correct the power factor of the entire building or any other facility.

<Configuration of Air Conditioning System>

The air conditioning system (100) includes the air conditioner (11) and the active filter (4). The air conditioner (11) includes a refrigerant circuit (not shown) having a compressor and the power converter (1).

The refrigerant circuit of the air conditioner (11) includes a compressor, an outdoor-side heat exchanger, an expansion mechanism, and an indoor-side heat exchanger connected together via a refrigerant pipe. The refrigerant circuit is filled with a refrigerant, which circulates in the refrigerant circuit, so that the room is cooled or heated.

The power converter (1) is connected to the AC power source (3) via the phase modification unit (200), and has a converter circuit and an inverter circuit. When the AC power is supplied from the AC power source (3), the power converter (1) converts the AC power into an AC power having a desired frequency and a desired voltage, and supplies the converted power to the compressor (more specifically, an electric motor included in the compressor). As a result, the compressor operates and the refrigerant circuit works, so that the air in the room is conditioned.

When the power converter (1) and the electric motor of the compressor in the air conditioner (11) operate, a harmonic current may be generated. This harmonic current may flow into the AC power source (3) via a current path that supplies the power to the power converter (1). The level of outflow of such harmonic current to the AC power source (3) is generally restricted.

Therefore, the active tilter (4) is incorporated in the air conditioning system (100). The active tilter (4) reduces the harmonic current generated in the power converter (1).

Further, in view of facility capacity and energy saving, for example, a power factor of fundamental wave at a distributing end and a receiving end is required to be corrected. Hence, the active filter (4) also has a function of correcting the power factor of fundamental wave. The active filter (4) corrects the power factor of fundamental wave, contributing to the correction of the power source power factor.

The configuration of the active filter (4) will be described below.

<Configuration of Active Filter>

The active filter (4) is connected to the AC power source (3) in parallel with the power converter (1) which is a source of the harmonic current, and has a function of canceling to the harmonic current flowing from the power converter (1) and appearing in a power receiving path from the AC power source (3). In other words, the active filter (4) supplies a compensation current such that a current flowing through a current path (hereinafter referred to as a "power receiving path (12)") of the AC power source (3) is brought close to a sinusoidal wave. More specifically, the active filter (4) generates a compensation current in antiphase with the harmonic current appearing in the power reception path (12), and supplies the compensation current to the power reception path (12).

The active filter (4) also has the function of correcting the power factor for correcting the power factor of fundamental wave by supplying the compensation current described above. In this example, the active filter (4) is configured to supply the compensation current which compensates for a reactive component of the fundamental wave, thereby correcting the power factor of fundamental wave.

In order to achieve the above function, the active filter (4) according to this embodiment includes a current source (730), filter-side current detectors (745a, 745b), a filter-side voltage detector (746), and an active filter controller (743), as shown in FIG. 11.

Note that the harmonic current generated in the power converter (1) is interpreted to be maximized when the load of the air conditioner (11) is the largest (for example, when the air conditioner (11) operates with a maximum power for cooling). Therefore, assuming a harmonic current of the air conditioner (11) under the maximum load, the capability (a magnitude of a current or power that can be generated) of the active filter (4), i.e., the capacity, is set. This capacity is referred to as a maximum output capacity. However, in general, the air conditioner (11) is often used under a load (e.g., an intermediate load) smaller than the maximum load. Thus, the active filter (4) whose the maximum output capacity is set in this way is interpreted to often have an excessive capacity during most of the operating time.

—Current Source—

The current source (730) generates a compensation current for reducing a harmonic current and correcting the power factor of fundamental wave. An output terminal of the current source (730) is connected to the power converter (1), and the generated compensation current is output to the power reception path (12).

Although not shown in the drawing, the current source (730) of this embodiment includes a so-called inverter circuit (active filter inverter). A switching command value (G) to be described later is input from the active filter controller (743) to the current source (730). The current source (730) performs switching in accordance with the switching command value (G) to generate the compensation current.

—Filter-Side Current Detector—

The filter-side current detectors (745a, 745b) detect current values (Ir2a, It2a) input to the current source (730) of the active filter (4).

In this example, two filter-side current detectors (745a, 745b) are provided for one active filter (4). The filter-side current detector (745a) detects an R-phase current value (Ir2a) input from the AC power source (3) to the current source (730), and the filter-side current detector (745b) detects a T-phase current value (It2a) input from the AC power source (3) to the current source (730). The current values (Ir2a, It2a) detected by the filter-side current detectors (745a, 745b) are transmitted to the active filter controller (743).

The configuration of the filter-side current detectors (745a, 745b) is not limited, but for example, a current transformer may be adopted.

Further, the filter-side current detectors (745a, 745b) may be configured to transmit the detection result to the active filter controller (743) in a wired or wireless manner.

This embodiment exemplifies a case where the filter-side current detectors (745a, 745b) detect the output current values (Ir2a, It2a) of the AC power source (3) for two phases. Alternatively, the filter-side current detectors (745a, 745b) may detect output current values of the AC power source (3) for three phases.

—Filter-Side Voltage Detector—

The filter-side voltage detector (746) is connected to the R phase and the S phase of the AC power source (3), but is not connected to the T phase. The filter-side voltage detector (746) detects only a line-to-line voltage (Vrs) of the AC power source (3), and inputs the line-to-line voltage (Vrs) to the active filter controller (743).

This embodiment exemplifies a case where the filter-side voltage detector (746) is connected to the outputs of the AC power source (3) for two phases. Alternatively the filter-side voltage detector (746) may be connected to the outputs of the AC power source (3) for three phases.

—Active Filter Controller—

The active filter controller (743) includes a microcomputer and a memory device storing a program for operating the microcomputer. As shown in FIG. 11, the active filter controller (743) is connected to the current source (730), the filter-side current detectors (745a, 745b), the filter-side voltage detector (746), and a phase modification unit controller (233) in the phase modification unit (200). The phase modification unit (200) will be described later. The active filter controller (743) controls an output current (i.e., a compensation current) of the current source (730) serving as the active filter inverter based on the result of detection by each detector (745a, 745b, 746) and the current values (Irs, Its) of the AC power source (3) sent through the phase modification unit controller (233).

<Configuration of Phase Modification Unit>

As shown in FIG. 11, the phase modification unit (200) on the power receiving path (12) is connected between an output of the AC power source (3) and each input of the power converter (1) and the active filter (4). The phase modification unit (200) has two phase modifiers (231, 232), a power meter (236), and the phase modification unit controller (233). The power meter (236) is an example of the load information detection unit.

—Phase Modifier—

The phase modifiers (231, 232) are connected to the AC power source (3) in parallel with the power converter (1) and the active filter (4). The phase modifiers (231, 232) control the reactive power of the power supplied to the power converter (1). In this example, the phase modifier (231) is a device capable of absorbing a reactive power of 20 kVar, and phase modifier (232) is a device capable of absorbing a reactive power of 50 kVar.

Each of the phase modifiers (231, 232) includes three phase advance capacitors (Ca, Cb, Cc), three phase advance reactors (La, Lb, Lc), and two switches (2311, 2321) (corresponding to the switching units). The reason why the phase modifiers (231, 232) include not only the phase advance capacitors (Ca, Cb, Cc) but also the phase advance reactors (La, Lb, Lc) is that the magnitude of the current flowing through the phase modifiers (231, 232) can be reduced by the phase advance reactors (La, Lb, Lc) if the phase advance capacitors (Ca, Cb, Cc) are broken due to short circuit.

Each switch (2311, 2321) turns the phase modifier (231, 232) ON and OFF based on a switching signal of the phase modifier equipment controller (233). In other words, each switch (2311, 2321) is used to switch the corresponding phase modifier (231, 232) and the AC power source (3) to the connected or disconnected state.

—Power Meter (Load Information Detecting Unit)—

The power meter (236) is a load information detection unit for detecting load information on the AC power source (3). The power meter (236) on the power receiving path (12) is connected between the output of the AC power source (3) and the inputs of the phase modifiers (231, 232). The power meter (236) has two power source-side current detectors (234a, 234b) and a single power source-side voltage detector (235).

Each power source-side current detector (234a, 234b) on the power receiving path (12) detects an output current, of the AC power source (3), before being divided into the phase modifiers (231, 232) and the air conditioning system (100). In this example, two power source-side current detectors (234 a, 234 b) are provided. Specifically, the power source-side current detector (234a) detects a current value (Irs) of the R phase in the AC power source (3). The power source-side current detector (234b) detects a current value (Its) of the T phase in the AC power source (3).

The power source-side voltage detector (235) is connected to an output terminal of each phase of the AC power source (3), and detects line-to-line voltages (Vrs, Vst, Vtr) of the AC power source (3), which are output voltages of the AC power source (3).

The power meter (236), which is the load information detection unit for detecting the load information on the AC power source (3), may be a power meter or a smart meter existing in the building or any other facility. This is because a sensor and a detection circuit for measuring the current and the voltage are not required separately from the power meter and the smart meter.

The configuration of the power source-side current detectors (234a. 234b) is not limited, but, for example, a current transformer may be adopted.

Further, the power source-side current detectors (234a. 234b) may be configured to transmit the detection result to the phase modification unit controller (233) in a wired manner or wirelessly. Note that the distance between the AC power source (3) and the active filter (4) may be about 20 to 30 meters. Therefore, when the power source-side current detectors (234a, 234b) are connected to the active filter (4) through a wire, this wire is routed long, and a considerable time and labor is required for the connection between the power source-side current detectors (234a, 234b) and the active filter (4). On the other hand, when the wireless manner is adopted to transmit the detection results of the power source-side current detectors (234a, 234b), the wire itself is no longer necessary, which does not require the operation of routing the wire. If transmission equipment is present nearby, the detection result may be transmitted via the transmission equipment in a manner that the connection is wirelessly made to the closest transmission point.

A phenomenon in which the current flowing through the power source-side current detectors (234a, 234b) changes a magnetic flux passing through the power source-side current detectors (234a, 234b) with reference to time is called electromagnetic induction. An induced electromotive force, which is an electromotive force generated through the electromagnetic induction may be used as a power source (e.g., a power source for communications) for driving the power source-side current detectors (234a, 234b). Accordingly, the power source-side current detectors (234a. 234b) can be operated with no power source (i.e., operated without an external power source connected from the outside of the power source-side current detectors (234a. 234b)), eliminating the need of connecting the power source-side current detectors (234a. 234b) to the external power source.

Further, in this embodiment, the power meter (236) functioning as a load information detection unit for detecting the load information on the AC power source (3), is provided inside the phase modification unit (200). Alternatively, the power meter (236), which is the load information detection unit for detecting the load information on the AC power source (3), may be provided outside the phase modification unit (200). In the case where the power meter (236) is provided inside the phase modification unit (200) as shown in this embodiment, the power meter (236) is not exposed to rain and wind, so that the reliability of the power meter (236) is increased and the life thereof can be extended.

Further, the power source-side current detectors (234a, 234b) are not limited to the two phases of the AC power source (3), and may be provided to correspond to each of the three phases of the AC power source (3).

—Phase Modification Unit Controller—

The phase modification unit controller (233) includes a microcomputer and a memory device storing a program for operating the microcomputer. As shown in FIG. 11, the phase modification unit controller (233) is connected to the power meter (236), the switches (2311, 2321) of the phase modifiers (231, 232), and the active filter controller (743) in the active filter (4). Based on a signal from the power meter (236), the phase modification unit controller (233) calculates a reactive power Pβ and a power source factor θαβ themselves, or calculates information for determining the reactive power Pβ and the power source factor θαβ. Further, the phase modification unit controller (233) controls switching of the switches (2311, 2321), and outputs the results detected by the power source-side current detectors (234a, 234b) to the active filter controller (743).

(Operation of Controlling Switching Each Switch by Phase Modification Unit Controller)

Figure 12:
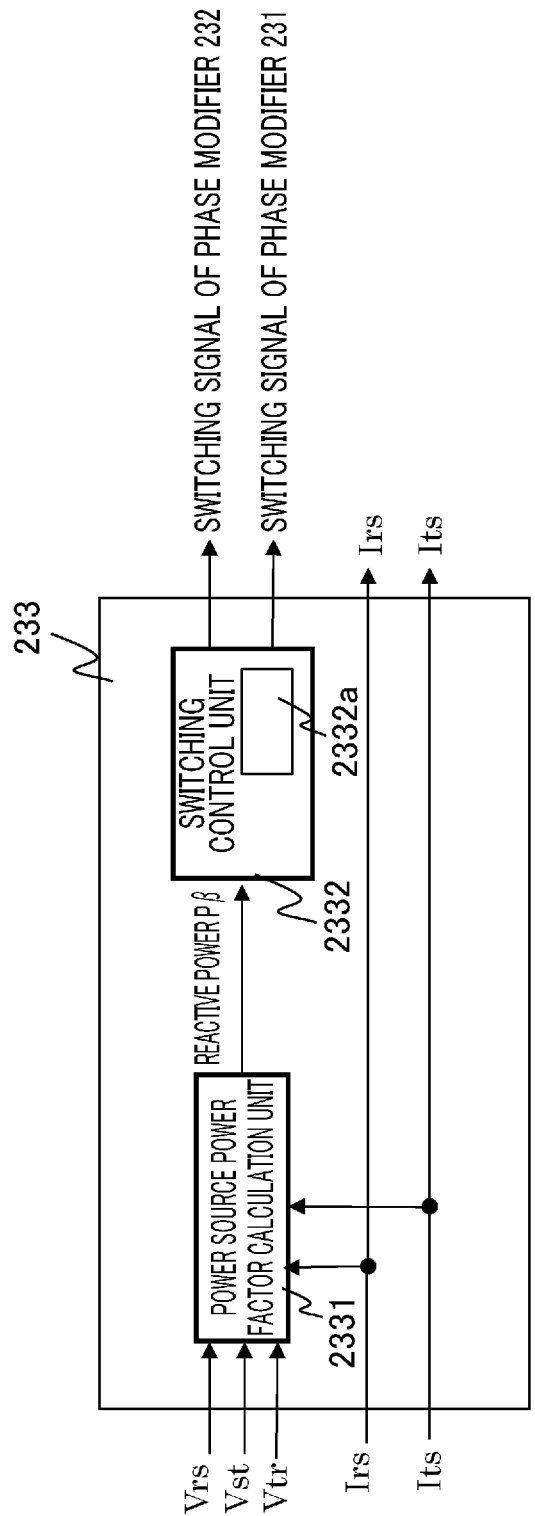
FIG. 12 is a block diagram illustrating a configuration of a phase modification unit controller according to the seventh embodiment.

As shown in FIG. 12, the phase modification unit controller (233) includes a power source power factor calculation unit (2331) and a switching control unit (2332).

—Power Source Power Factor Calculation Unit—

The power source power factor calculation unit (2331) receives the line-to-line voltages (Vrs, Vst, Vtr) detected by the power source-side voltage detector (235) of the power meter (236) and the detection results (Irs, Its) of the power source-side current detectors (234a, 234b). The power source power factor calculation unit (2331) applies these input signals to the following Formula (7-1) and Formula (7-2) to calculate the voltages Vα, Vβ, and currents iα, iβ of the two rotation axes (αβ axes) of the two rotation axes.

[Math. 1]

$$\begin{bmatrix} V\alpha \\ V\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Vrs \\ Vst \\ Vtr \end{bmatrix} \quad (7\text{-}1)$$

[Math. 2]

$$\begin{bmatrix} i\alpha \\ i\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Irs \\ -Irs - Its \\ Its \end{bmatrix} \quad (7\text{-}2)$$

Next, the power source power factor calculation unit (2331) applies the voltages Vα, Vβ and the currents iα, iβ of the two rotation axes (αβ axes) obtained by the above formulae (7-1) and (7-2) to the following Formula (7-3) and Formula (7-4), thereby calculating the effective power Pα and the reactive power Pβ.

[Math. 3]

$$P\alpha = V\alpha \times i\alpha + V\beta \times i\beta \quad (7\text{-}3)$$

[Math. 4]

$$P\beta = V\alpha \times i\beta - V\beta \times i\alpha \quad (7\text{-}4)$$

When each of the effective power Pα and the reactive power Pβ is applied to the following Formula (7-5), the power source power factor θαβ of the AC power source (3) is obtained.

[Math. 5]

$$\theta\alpha\beta = \frac{P\alpha}{\sqrt{(P\alpha)^2 + (P\beta)^2}} \quad (7\text{-}5)$$

The above Formula (7-5) indicates that the power source power factor θαβ decreases with the increase in the reactive power Pβ, and conversely, the power source power factor θαρ increases with the decrease in the reactive power Pβ, thereby increasing (correcting) the power factor. In this embodiment, the reactive power Pβ is used to generate a switching signal of the phase modifier (231, 232). However, the power source power factor θαβ, or both of the reactive power Pβ and the power source power factor θαβ may be calculated to be used for the generation of the switching signal of the phase modifier (231, 232).

—Switching Control Unit—

The switching control unit (2332) receives the reactive power Pβ calculated by the power source power factor calculation unit (2331). The switching control unit (2332) controls switching of the switches (2311, 2321) in each of the phase modifier (231,232) so that the combination of the connection state of the AC power source (3) and each of the phase modifiers (231, 232) may be changed according to the reactive power Pβ. Specifically, the switching control unit (2332) applies the reactive power Pβ to a switching combination table (2332a) of the phase modifiers (231, 232) shown in FIG. 13, and determines a logic of the connection and disconnection of each phase modifier (231, 232). The switching control unit (2332) outputs a switching signal corresponding to the logical determination to the switches (2311, 2321) in the respective phase modifiers (231, 232).

Figure 13:
FIG. 13 conceptually illustrates a table showing a switching combination table of a phase modifier.

Here, the switching combination table (2332a) of FIG. 13 is used as a reference for the logical determination, and in this case, a possible combination of the phase modifier (232) of 20 kVar and the phase modifier (231) of 50 kVar has four patterns of 0 kVar, 20 kVar, 50 kVar, and 70 kVar.

In FIG. 13, the range of a load indicated by the reactive power Pβ (a reactive power load range) is defined in four patterns of, for example, "0 kVar~to 3 kVar," "3 kVar to 20 kVar,", "20 kVar to 50 kVar", and "50 kVar to 70 kVar," and a connection state between each phase modifier (231, 232) and the power receiving path (12) is represented for each pattern. The switching combination table (2332a) of FIG. 13 is predetermined. e.g., before the power source power factor control system (7000) is built in the site. In FIG. 13, the case where the phase modifiers (231, 232) are connected to the power receiving path (12) is indicated by "CONNECTION", and the case where the phase modifier (231, 232) is not connected to the power receiving path (12) is indicated by "DISCONNECTION." In other words, the switches (2311, 2321) corresponding to the phase modifier (231, 232) marked "DISCONNECTION" bring the phase modifiers (231, 232) and the power receiving path (12) in a disconnected state, and the switches (2311, 2321) corresponding to the phase modifiers (231, 232) marked "CONNECTION" bring the phase modifiers (23, 232) and the power receiving path (12) in a connected state.

For example, in FIG. 11 and FIG. 13, when the reactive power Pβ gradually increases from 0 kVar to 70 kVar, the switching operation by the switches (2311, 2321) is performed in accordance with the following order of (1) to (4).

(1) Both of the phase modifiers (231, 232) are disconnected from the power receiving path (12).

(2) While maintaining the phase modifier (231) of 50 kVar disconnected from the power receiving path (12), the phase modifier (232) of 20 kVar is connected to the power receiving path (12).

(3) The phase modifier (232) of 20 kVar is disconnected from the power receiving path (12), and the phase modifier (231) of 50 kVar is connected to the power receiving path (12).

(4) While maintaining the connection between the phase modifier (231) of 50 kVar and the power receiving path (12), the phase modifier (232) of 20 kVar is connected again to the power receiving path (12) (70 kVar in total).

Further, when the reactive power Pβ is advanced from a cutoff point (a threshold defining a reactive power load range of FIG. 13) set in advance, i.e., the state in which compensation of the reactive power Pβ by the phase advance capacitors (Ca, Cb, Cc) is excessive, the switching control unit (2332) reduces the number of the phase modifiers (231, 232) (specifically, the phase advance capacitors (Ca, Cb, Cc)) connected. In this case as well, the switching control unit (2332) selects a combination of the phase modifiers (231, 232) necessary and sufficient to compensate for the reactive power Pβ acting as a load, and performs control for connecting a selected phase modifier (231, 232) and disconnecting the other phase modifier (231, 232).

Figure 14:
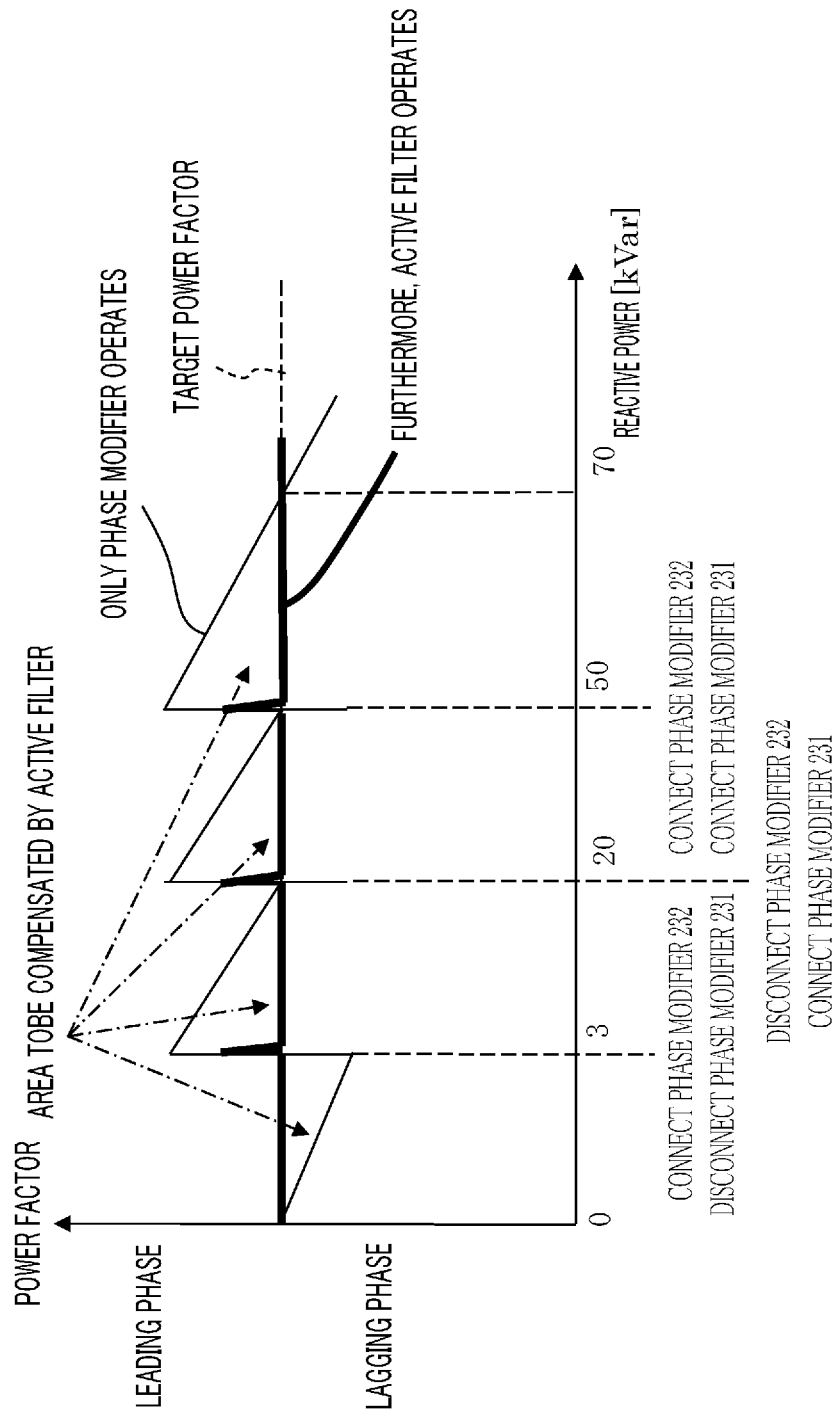
FIG. 14 is a diagram showing a state in which compensation is not performed by an active filter and a state in which compensation is performed by an active filter in the seventh embodiment.

According only to the control of the reactive power Pβ by the phase modification unit controller (233), as indicated by the thin solid lines in FIG. 14, the power source power factor θαβ of the AC power source (3) is once advanced from a target power factor within the range of the reactive power Pβ from 0 kVar to 70 kVar at a timing when the connection state of the phase modifiers (231, 232) is switched, and thereafter, the power source power factor θαβ gradually approaches the target power factor. This is repeated every time the connection state of the phase modifiers (231, 232) is switched.

<Control for Power Factor Correction by Active Filter Controller>

On the other hand, the active filter controller (743) controls the operation of generating the compensation current by the current source (730) of the active filter (4) so that a leading power factor caused by the control of the phase modification unit controller (233) on the reactive power Pβ is corrected based on the AC power source (3). In other words, the control by the current source (730) of the generation operation of the compensation current further corrects the power source power factor θαβ of the AC power source (3), such that the power factor θαβ is instantaneously converged to the target power factor.

Figure 15:
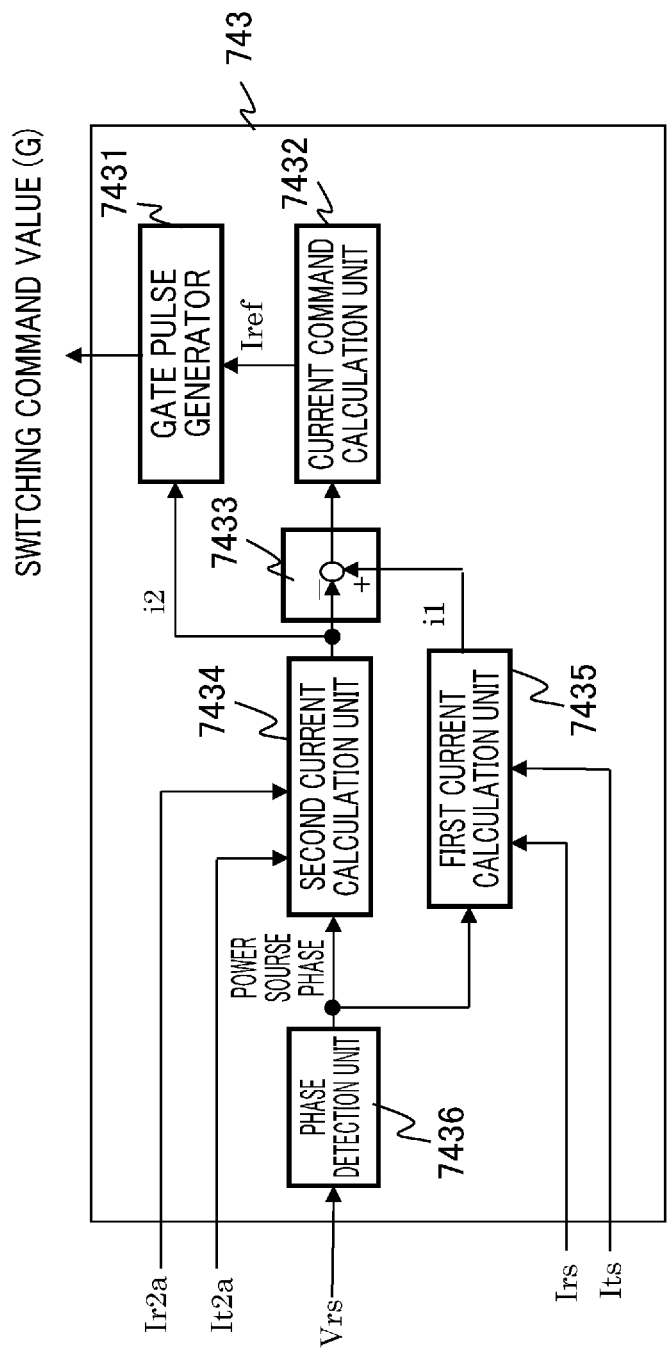
FIG. 15 is a block diagram illustrating a configuration of an active filter controller according to the seventh embodiment.

As shown in FIG. 15, the active filter controller (743) includes a phase detector (7436), a first current calculation unit (7435), a second current calculation unit (7434), a load current calculation unit (7433), a current command calculation unit (7432), and a gate pulse generator (7431).

The phase detector (7436) receives the line-to-line voltage (Vrs) of the AC power source (3) detected by the filter-side voltage detector (746). The phase detector (7436) detects a phase of the power source voltage in the power reception path (12) using the input line-to-line voltage (Vrs), and outputs the detected phase to the first current calculation unit (7435) and the second current calculation unit (7434).

The first current calculation unit (7435) receives a phase of the power source voltage detected by the phase detector (7436), and the current values (Irs, Its) of the AC power source (3) detected by the power source-side current detectors (234a, 234b). Based on the input signals, the first current calculation unit (7435) calculates a current value (hereinafter, referred to as a "first current value (i1)") necessary for performing both of the compensation (reduction) of the harmonic current in the power reception path (12) and the compensation of the reactive component of the fundamental wave (correction of the power factor of fundamental wave). The first current calculation unit (7435) outputs the obtained first current value (i1) to the load current calculation unit (7433).

The second current calculation unit (7434) receives a phase of the power source voltage detected by the phase detector (7436), and the current values (Ir2a, It2a) detected by the filter-side current detector (745a, 745b) and input to the current source (730). Based on these input signals, the second current calculation unit (7434) obtains a current (will be hereinafter referred to as a "second current value (i2)") flowing into the active filter (4) performing both the compensation of the harmonic current at present (reduction of the harmonic current) and the compensation of the reactive component of the fundamental wave (correction of the power factor of fundamental wave). The second current calculation unit (7434) outputs the obtained second current value (i2) to the load current calculation unit (7433).

From the current values (Irs, Its) of the AC power source (3), the current values (Ir2a, It2a) input to the current source (730) of the active filter (4) is subtracted. Obtained as a result the total value of the currents flowing through the power converter (1) to be a source of a harmonic wave and the phase modifiers (231, 232) of the phase modification unit (200). Using the total value, in this embodiment, the power factor of fundamental wave of the power converter (1) is corrected, and the leading power factor is corrected by the phase modification unit (200). Such features achieve the correction of the power factor of fundamental wave at a distributing end and a receiving end near the AC power source (3), and the reduction of the harmonic current. In other words, it can be said that the active filter (4) of this embodiment serves as a load for correcting the leading power factor of the phase modification unit (200).

Specifically, the load current calculation unit (7433) obtains a total value of the currents flowing through the power converter (1) and the respective phase modifiers (231, 232) of the phase modification unit (200) by subtracting the second current value (i1) of the second current calculation unit (7434) from the first current value (i1) of the first current calculation unit (7435), and outputs the obtained calculation result to the current command calculation unit (7432).

The current command calculation unit (7432) calculates the current value in antiphase with the calculation result of the load current calculation unit (7433), and outputs the calculated value as a current command value (Iref) to the gate pulse generator (7431).

The gate pulse generator (7431) generates a switching command value (G) for instructing the switching of the inverter circuit (active filter inverter) serving as the current source (730). Specifically, the gate pulse generator (7431) performs a so-called feedback control of repeating the generation of the switching command value (G) in accordance with a deviation between the current value output from the current source (730) and the current command value (Iref). As a result, the current source (730) feeds the current (compensation current) corresponding to the current command value (Iref) to the power receiving path (12).

More specifically, the gate pulse generator (7431) generates the switching command value (G) which allows the second current value (i2) obtained by the second current calculation unit (7434) to match the current command value (Iref), and outputs the switching command value (G) to the current source (730). As a result, the harmonic component contained in the current flowing through the power converter (1) and the current output from the active filter (4) cancel each other. The output currents (Irs, Itr, Its) of the AC power source (3) become a sinusoidal form from which the harmonic current is removed, thereby correcting the power factor.

In this embodiment, as described above, the active filter controller (743) receives not only the current values (Ir2a, It2a) to be input to the current source (730), but also the current values (Irs, Its) of the AC power source (3). Therefore, the active filter controller (743) can calculate the sum of the current flowing through the phase modifiers (231, 232) and the current flowing through the power converter (1), and can adjust the compensation current of the current source (730) in accordance with the result of the calculation. Accordingly, through a series of control performed by the active filter controller (743), the active filter controller (743) controls the actual power source power factor θαβ, which is influenced not only by the power converter (1) but also by the phase modifiers (231, 232), to match the actual power source power factor θαβ with the target power factor.

In particular, the current source (730) in the operation of the active filter (4) changes the power source power factor θαβ to be a lagging power factor in relation to the target power factor. The active filter controller (743) performs control to operate the current source (730) of the active filter (4) so that the leading power factor of the phase modifiers (231, 232) is canceled by the lagging power factor of the active filter (4), thereby converging the power source power factor θαβ of the AC power source (3) to the target power factor.

FIG. 14 shows the power source power factor θαβ with thin solid lines, and the target power factor with a broken line in a state where the phase modification unit (200) is operating under the control of the phase modification unit controller (233) described above, but the active filter (4) is not in operation. Every time the connection state of each phase modifier (231, 232) is switched by the phase modification unit controller (233), the power source power factor cap is once advanced with respect to the target power factor, and then gradually approaches the target power factor. Therefore, in FIG. 14, an area, of the power source power factor θαβ, to be compensated for by the active tilter (4) appears in the area surrounded by the thin solid lines and the broken line.

FIG. 14 shows the power source power factor θαβ with a thick solid line in a state where the active filter (4) operates under the control of the active filter controller (743) described above. With the exception that the power source power factor θαβ becomes a leading power factor only for a moment with respect to the target power factor at the time when the phase modifiers (231, 232) switch, the power source power factor θαβ shown by the thick solid line in FIG. 14 is instantaneously converged to the target power factor as compared to with the thin solid line because the leading power factor of the phase modification unit (200) is mostly canceled by the lagging power factor of the active filter (4). In other words, the region of the power source power factor θαβ to be compensated for by the active filter (4) is compensated by the operation of the active filter (4) under the control of the active filter controller (743) described above.

Thus, the power source power factor control system (7000) according to this embodiment can correct the leading power caused by the phase modification unit (200) through the operation of the active filter (4).

In this embodiment, the case where a single air conditioning system (100) is connected to the power receiving path (12) has been illustrated as an example. If other devices installed in the building are also connected to the power receiving path (12), the power source power factor control system (7000) can reduce the leading power factor caused by the phase modification unit (200) to correct the power factor of fundamental wave of the entire building.

<Effects>

When the active filter (4) operates, the actual power source power factor θαβ becomes a lagging power factor in relation to the target power factor, in contrast to the phase modifier (231, 232), Accordingly, in this embodiment, the operation of the active filter (4) is controlled to correct the actual power source power factor θαβ to be a leading power factor in relation to the target power factor because of the control of the reactive power Pβ by the phase modifier (231,232). Thus, a phenomenon in which the actual power source power factor θαβ becomes the leading power factor due to the phase modifier (231, 232) is easily improved. Thus, the actual power source power factor θαβ can be appropriately compensated for, and the power factor of fundamental wave can be corrected. Accordingly, it is possible to reduce the possibility of the occurrence of failures such as an increase in power loss of the power system of the AC power source (3) and an unnecessary increase in the voltage of the system.

More specifically, the operation of the active filter (4) is controlled so that the leading power factor of the phase modifiers (231, 232) is canceled by the lagging power factor of the active filter (4), and thus, the power source power factor θαβ of the AC power source (3) is converged to the target power factor.

In this embodiment, an actual value of the reactive power Pβ used for the control of the power source power factor ζαβ can be easily obtained through a calculation based on the result of detection by the power source-side current detector (234a, 234b) and the result of detection by the power source-side voltage detector (235).

The power meter (236) is connected to a structure, such as a building or a factory, for measuring electric power from the actual values of the current and voltage. The power meter (236) is an example of a load information detection unit which detects load information on the AC power source (3). In this embodiment, since a power meter to be used here; that is, the power meter (236), previously includes the power source-side current detectors (234a, 234b) and the power source-side voltage detector (235), it is not necessary to attach a sensor and a detection circuit for detecting a current and a voltage. Therefore, a construction work for separately mounting the sensor and the detection circuit is no longer necessary, and thus, the cost for the sensor and the detection circuit can be saved.

In this embodiment, switching control of the switch (2311, 2321) is performed in accordance with the reactive power Pβ of the AC power source (3), and the combination of the connection state of the AC power source (3) and the phase modifier (231, 232) is changed as appropriate. For example, the fewer the phase modifiers (231, 232) are for controlling the reactive power Pβ to the AC power source (3), the lower the degree of the advance of the power factor caused by the control of the phase modifiers (231, 232), and the compensation amount of the active filter (4) is also reduced accordingly, so that the capacity of the active filter (4) can be reduced.

In addition, in this embodiment, the air conditioning system (100) (specifically, the power converter (1) in the air conditioning system (100)) is a harmonics generator, and the active filter (4) is incorporated in an air conditioning system.

OTHER EMBODIMENTS

Note that the active filter (4) does not necessarily have to have the function of correcting the power factor of fundamental wave. In other words, the active filter (4) may be configured to have only the function of reducing the harmonic current. Further, the active filter (4) may be configured to have only the function of correcting the power factor of fundamental wave.

In addition, a plurality of active filters (4) can be provided to a single air conditioner (11). In this case, in each active filter (4), a compensation current may be shared in accordance with a current capacity of each active filter (4).

In addition, the load information detection unit which detects the load information on the AC power source (3) may use, instead of the first current detection unit (5) and the current sensor (6125), a device having a function of measuring the load information, to calculate and transmit a fundamental wave component, a power factor, and a reactive power of the current. Examples of such a device include a so-called smart meter which is provided in a building or any other facility, and transmits information such as a usage amount of electric power to an electric power company. If the smart meter is used, the active filter may be operated based on the load information sent at a predetermined time interval, not based on the instantaneous information obtained by a current detector, for example.

In addition, in the above embodiment, the controller (43) is mounted on the active filter (4). Alternatively, the controller (43) may be mounted anywhere as long as it is inside a device with a built-in active filter. For example, although not shown in the drawings, the controller (43) may be mounted on the power converter (1) also to control the power converter (1).

INDUSTRIAL APPLICABILITY

The present invention is useful as a device with a built-in active filter.

DESCRIPTION OF REFERENCE CHARACTERS

1 Power Converter (Load Device)
2 Load Device
3 AC Power Source
4 Active Filter
4a Current Detector
4b Current Detector
4c Current Detector 5 First Current Detection Unit (Load Information Detection Unit)
11 Air Conditioner
30 Current Source
60 Distribution Board
100 Device with Built-In Active Filter

The invention claimed is:

1. A device with a built-in active filter, the device including an active filter and being connected to an AC power source to which a phase modification unit with a leading phase capacitor is connected, wherein
the active filter is configured to operate based on a value detected by a load information detection unit detecting load information on the AC power source outside the device with a built-in active filter, and
the device with the built-in active filter is configured to detect the value detected by a load information detection unit detecting load information on the AC power source and a current flowing from the AC power source to the active filter, and to provide a compensation current having a component corresponding to a reactive current in the AC power source.

2. The device with a built-in active filter of claim 1, wherein
the load information detection unit is configured to detect a current value, and to transmit the detected current value in a wireless manner.

3. The device with a built-in active filter of claim 1, wherein
the load information detection unit operates with no power source.

4. The device with a built-in active filter of claim 1, wherein
the load information detection unit is provided with current detectors for detecting current values, each of the current detectors corresponding to one of phases of the AC power source.

5. A device with a built-in active filter, the device including an active filter and being connected to an AC power source,
the active filter is configured to operate based on a value detected by a load information detection unit detecting load information on the AC power source outside the device with a built-in active filter,
the operation of the active filter is controlled by a controller included in the device with a built-in active filter, and
the controller obtains a degree of the current output by the active filter, using a current value corresponding to a reactive current in a load device connected to the AC power source and a current value of a current flowing from the AC power source to the active filter.

6. The device with a built-in active filter of claim 5, wherein
the active filter uses only a fundamental wave component of the reactive current as the current value corresponding to the reactive current.

7. A device with a built-in active filter, the device including an active filter and being connected to an AC power source, wherein
the active filter is configured to operate based on a value detected by a load information detection unit detecting load information on the AC power source outside the device with a built-in active filter,
a phase modification unit is connected to the AC power source in parallel with the device with a built-in active filter to control a reactive power of the AC power source, and
based at least on one of the reactive power of or a power source power factor of the AC power source, the active filter operates to correct a leading power factor caused by the control of the reactive power by the phase modification unit.

8. A device with a built-in active filter, the device including an active filter and being connected to an AC power source, wherein the active filter is configured to operate based on a value detected by a load information detection unit detecting load information on the AC power source outside the device with a built-in active filter, a magnitude of the current output from the active filter is calculated, using: a current value corresponding to a reactive current of a phase modification unit and a load device other than the device with a built-in active filter; and a current value of a current flowing from the AC power source to the load device.

* * * * *